United States Patent
Niccolini et al.

(10) Patent No.: US 10,474,228 B2
(45) Date of Patent: Nov. 12, 2019

(54) DISPLAY SYSTEM FOR REMOTE CONTROL OF WORKING MACHINE

(71) Applicant: YANMAR CO., LTD., Osaka-shi (JP)

(72) Inventors: Marta Niccolini, Florence (IT); Antonio Alba, Florence (IT); Shingo Eguchi, Florence (IT); Junya Kusuno, Florence (IT); Paolo Tripicchio, Pisa (IT); Emanuele Ruffaldi, Pisa (IT); Carlo A. Avizzano, Pisa (IT); Paolo S. Gasparello, Pisa (IT)

(73) Assignee: YANMAR CO., LTD., Osaka (JP)

( * ) Notice: Subject to any disclaimer, the term of this patent is extended or adjusted under 35 U.S.C. 154(b) by 125 days.

(21) Appl. No.: 15/524,823

(22) PCT Filed: Nov. 17, 2014

(86) PCT No.: PCT/IB2014/002551
§ 371 (c)(1),
(2) Date: May 5, 2017

(87) PCT Pub. No.: WO2016/079557
PCT Pub. Date: May 26, 2016

(65) Prior Publication Data
US 2017/0322624 A1 Nov. 9, 2017

(51) Int. Cl.
*G06F 3/01* (2006.01)
*E02F 9/08* (2006.01)
(Continued)

(52) U.S. Cl.
CPC .............. *G06F 3/013* (2013.01); *E02F 5/145* (2013.01); *E02F 9/0858* (2013.01); *E02F 9/205* (2013.01); *E02F 9/262* (2013.01); *H04N 7/18* (2013.01)

(58) Field of Classification Search
CPC ........ G06F 3/013; E02F 5/145; E02F 9/0858; E02F 9/205; E02F 9/261; E02F 9/262;
(Continued)

(56) References Cited

U.S. PATENT DOCUMENTS 6,195,204 B1    2/2001  Nalwa
6,665,003 B1   12/2003  Peleg et al.
(Continued)

FOREIGN PATENT DOCUMENTS

JP    2000-089395 A    3/2000
JP    2001-136518 A    5/2001
(Continued)

OTHER PUBLICATIONS

International Search Report dated Jul. 14, 2015, issued for PCT/JP2014/002551.
(Continued)

*Primary Examiner* — Jamie J Atala
*Assistant Examiner* — Hesham K Abouzahra
(74) *Attorney, Agent, or Firm* — Norton Rose Fulbright US LLP

(57) ABSTRACT

The display system for remote control of a working machine includes a plurality of camera units and an image processing device, both provided on or in a working machine, and a display device and a remote control device, both provided in the remote control side. The display device detects movement of the head of an operator and transmits the detected movement of the head of the operator to the remote control device. The remote control device transmits, to the image processing device over wireless communications, the movement of the head of the operator transmitted from the display device. The image processing device adjusts, for transmission to the display device, parts of left-eye and right-eye
(Continued)

panoramic images according to the movement of the head of the operator transmitted from the remote control device.

20 Claims, 14 Drawing Sheets

(51) Int. Cl.
*E02F 9/20* (2006.01)
*E02F 5/14* (2006.01)
*E02F 9/26* (2006.01)
*H04N 7/18* (2006.01)

(58) Field of Classification Search
CPC ........ G05D 1/0038; G08C 17/02; H04N 7/18; H04N 7/181
See application file for complete search history.

(56) References Cited

U.S. PATENT DOCUMENTS

| | | | |
|---|---|---|---|
| 6,795,109 B2 | 9/2004 | Peleg et al. | |
| 8,274,550 B2 | 9/2012 | Steuart, III et al. | |
| 8,355,041 B2 | 1/2013 | Chen et al. | |
| 9,715,008 B1* | 7/2017 | Cote | G01S 13/885 |
| 9,983,406 B2* | 5/2018 | Lee | G02B 27/0093 |
| 2001/0038413 A1 | 11/2001 | Peleg et al. | |
| 2004/0223051 A1 | 11/2004 | Peleg et al. | |
| 2004/0246333 A1 | 12/2004 | Steuart, III et al. | |
| 2006/0103723 A1 | 5/2006 | Scire, Jr. | |
| 2007/0002131 A1 | 1/2007 | Ritchey | |
| 2007/0014347 A1 | 1/2007 | Prechtl et al. | |
| 2007/0024701 A1 | 2/2007 | Prechtl et al. | |
| 2007/0126863 A1* | 6/2007 | Prechtl | H04N 5/232 348/43 |
| 2007/0182812 A1 | 8/2007 | Ritchey | |
| 2008/0024594 A1 | 1/2008 | Ritchey | |
| 2010/0045773 A1 | 2/2010 | Ritchey | |
| 2012/0113209 A1 | 5/2012 | Ritchey et al. | |
| 2012/0327185 A1 | 12/2012 | Steuart, III | |
| 2013/0063550 A1 | 3/2013 | Ritchey et al. | |
| 2014/0118488 A1 | 5/2014 | Steuart, III | |
| 2014/0364212 A1* | 12/2014 | Osman | A63F 13/213 463/31 |
| 2015/0207991 A1 | 7/2015 | Steuart, III | |
| 2015/0324692 A1 | 11/2015 | Ritchey et al. | |
| 2015/0350542 A1 | 12/2015 | Steuart, III | |
| 2016/0255305 A1 | 9/2016 | Ritchey et al. | |
| 2017/0061034 A1 | 3/2017 | Ritchey et al. | |

FOREIGN PATENT DOCUMENTS

| | | |
|---|---|---|
| JP | 2003-524927 A | 8/2003 |
| JP | 2003-532914 A | 11/2003 |
| JP | 2004-512701 A | 4/2004 |
| JP | 2005-114235 A | 4/2005 |
| JP | 2005-308282 A | 11/2005 |
| JP | 2007-525054 A | 8/2007 |
| JP | 2008-111269 A | 5/2008 |
| JP | 2008111269 A * | 5/2008 |
| JP | 2010-166596 A | 7/2010 |
| JP | 2011-160442 A | 8/2011 |
| JP | 2012-080554 A | 4/2012 |
| JP | 2012-257329 A | 12/2012 |
| JP | 2013-038807 A | 2/2013 |
| WO | 00/39995 A2 | 7/2000 |
| WO | 01/79908 A1 | 10/2001 |
| WO | 01/80545 A2 | 10/2001 |
| WO | 2004/109385 A2 | 12/2004 |
| WO | 2006/110584 A2 | 10/2006 |
| WO | 2009/102503 A2 | 8/2009 |
| WO | 2014/077046 A1 | 5/2014 |

OTHER PUBLICATIONS

Japanese Office Action dated Jul. 3, 2018 issued in corresponding Japanese Application 2017-522339 cites the patent documents above.

* cited by examiner (Second Embodiment)

(Third Embodiment)

(Fourth Embodiment)

(Fifth Embodiment)

(Sixth Embodiment)

(Seventh Embodiment)

DISPLAY SYSTEM FOR REMOTE CONTROL OF WORKING MACHINE

TECHNICAL FIELD

The present invention relates to a display system that displays an image transmitted from a working machine for remote control of the working machine.

BACKGROUND ART

There have been display systems that display images transmitted from a working machine for remote control of the working machine. The conventional display system includes a camera or a set of cameras that is/are attached to a working machine and controlled remotely from a place located at a distance from a working site where the working machine is at work. The system transmits an image (movie) captured by the camera to a remote control side of the display system over wireless communications so that the display device in the remote control side can display the captured image in real time.

For example, JP2008111269A discloses a display system displaying a panoramic image of the circumstance of a working machine on a display device in real time.

JP2002345058A, as another example, discloses a display system displaying an image of a working site on a display device in real time based on data transmitted from a camera attached to a construction machine. The data transmission is carried out by 2.4 GHz small power radio because of constraints of the Radio Law.

SUMMARY OF INVENTION

Problems to be Solved by the Invention

The display system for remote control of a working machine is hopefully capable of tracking movement of the line of sight of an operator and accordingly changing the image being displayed on a display device to improve remote control operability.

JP2008111269A, however, discloses nothing more than a display system changing panoramic images in response to a pedal operation. JP2008111269A does not always deliver a good operation feeling because the display system does not track movement of the line of sight of the operator to accordingly change the image being displayed on the display device. Neither does JP2002345058A disclose a display system tracking movement of the line of sight of the operator to accordingly change the image being displayed on the display device.

The patent documents listed below represent exemplary technology that is related to the present invention. However, none of them anticipates the present invention.

U.S. Pat. No. 6,795,109B2
U.S. Pat. No. 8,274,550B2
U.S. Pat. No. 6,195,204B1
US2006/0103723A1
US2007/0182812A1
U.S. Pat. No. 8,355,041B2

Accordingly, the present invention has an object to provide a display system for remote control of a working machine, the display system being capable of tracking movement of the line of sight of an operator to accordingly change the image being displayed on a display device.

Solution to Problem

The present invention, to achieve the object, provides a display system for remote control of a working machine, the display system having a first aspect to a fourth aspect.

(1) First Aspect of the Display System

The display system in its first aspect is a display system for remote control of a working machine including: a plurality of camera units attached to a working machine having a working component capable of horizontal rotation and vertical swinging; an image processing device, provided in the working machine, that generates a panoramic image based on a plurality of images captured by the plurality of camera units and transmits a part of the generated panoramic image over wireless communications; a display device in a remote control side of the display system; and a remote control device that receives the part of the panoramic image from the image processing device and transmits the received part of the panoramic image to the display device, wherein each camera unit includes a pair of a left-eye camera and a right-eye camera, the image processing device generates a left-eye panoramic image and a right-eye panoramic image based respectively on left-eye and right-eye images captured by the pairs of cameras and transmits parts of the generated left-eye and right-eye panoramic images to the remote control device over wireless communications, the remote control device receives the parts of the left-eye and right-eye panoramic images from the image processing device and transmits the received parts of the left-eye and right-eye panoramic images to the display device, the display device, designed to be mounted on the head of an operator, receives the parts of the left-eye and right-eye panoramic images from the remote control device and displays the received parts of the left-eye and right-eye panoramic images, as well as detects movement of eyeballs of the operator and transmits the detected movement of the eyeballs of the operator to the remote control device, the remote control device transmits, to the image processing device over wireless communications, the movement of the eyeballs of the operator transmitted from the display device, and the image processing device adjusts the parts of the left-eye and right-eye panoramic images that are to be transmitted to the display device according to the movement of the eyeballs of the operator transmitted from the remote control device, and if a response speed of the movement of the eyeballs of the operator is faster than a predetermined response speed, the image processing device implements an adjusting process or a cut-out process by delaying the response speed of the movement of the eyeballs of the operator.

(2) Second Aspect of the Display System

The display system in its second aspect is a display system for remote control of a working machine, comprising: a plurality of camera units attached to a working machine having a working component capable of horizontal rotation and vertical swinging; an image processing device, provided in the working machine, that generates a panoramic image based on a plurality of images captured by the plurality of camera units and transmits a part of the generated panoramic image over wireless communications; a display device in a remote control side of the display system; and a remote control device that receives the part of the panoramic image from the image processing device and transmits the received part of the panoramic image to the display device, wherein each camera unit includes a pair of a left-eye camera and a right-eye camera, the image processing device generates a left-eye panoramic image and a right-eye panoramic image based respectively on left-eye and right-eye images captured by the pairs of cameras and transmits parts of the generated left-eye and right-eye panoramic images to the remote control device over wireless communications, the remote control device receives the parts of the left-eye and right-eye panoramic images from the image processing device and transmits the received parts of the left-eye and right-eye panoramic images to the display device, the display device, designed to be mounted on the head of an operator, receives the parts of the left-eye and right-eye panoramic images from the remote control device and displays the received parts of the left-eye and right-eye panoramic images, as well as detects movement of the head of the operator and transmits the detected movement of the head of the operator to the remote control device, the remote control device transmits, to the image processing device over wireless communications, the movement of the head of the operator transmitted from the display device, the image processing device adjusts the parts of the left-eye and right-eye panoramic images that are to be transmitted to the display device according to the movement of the head of the operator transmitted from the remote control device, and the display device displays, along with the parts of the left-eye and right-eye panoramic images, a part of work-assisting information that corresponds to the parts of the left-eye and right-eye panoramic images based on a database prepared in advance in the display system or a database located at a different location than the display system, in such a manner that the part of work-assisting information coincides with the parts of the left-eye and right-eye panoramic images.

(3) Third Aspect of the Display System

The display system in its third aspect is a display system for remote control of a working machine including: a plurality of camera units attached to a working machine having a working component capable of horizontal rotation and vertical swinging; an image processing device, provided in the working machine, that generates a panoramic image based on a plurality of images captured by the plurality of camera units and transmits the generated panoramic image over wireless communications; a display device in a remote control side of the display system; and a remote control device that receives the panoramic image from the image processing device and transmits a part of the received panoramic image to the display device, wherein each camera unit includes a pair of a left-eye camera and a right-eye camera, the image processing device generates a left-eye panoramic image and a right-eye panoramic image based respectively on left-eye and right-eye images captured by the pairs of cameras and transmits the generated left-eye and right-eye panoramic images to the remote control device over wireless communications, the remote control device receives the left-eye and right-eye panoramic images from the image processing device and transmits parts of the received left-eye and right-eye panoramic images to the display device, the display device, designed to be mounted on the head of an operator, receives the parts of the left-eye and right-eye panoramic images from the remote control device and displays the received parts of the left-eye and right-eye panoramic images, as well as detects movement of eyeballs of the operator and transmits the detected movement of the eyeballs of the operator to the remote control device, the remote control device adjusts the parts of the left-eye and right-eye panoramic images that are to be transmitted to the display device according to the movement of the eyeballs of the operator transmitted from the display device, and if a response speed of the movement of the eyeballs of the operator is faster than a predetermined response speed, the remote control device implements an adjusting process or a cut-out process by delaying the response speed of the movement of the eyeballs of the operator.

(4) Fourth Aspect of the Display System

The display system in its fourth aspect is a display system for remote control of a working machine, comprising: a plurality of camera units attached to a working machine having a working component capable of horizontal rotation and vertical swinging; an image processing device, provided in the working machine, that generates a panoramic image based on a plurality of images captured by the plurality of camera units and transmits the generated panoramic image over wireless communications; a display device in a remote control side of the display system; and a remote control device that receives the panoramic image from the image processing device and transmits a part of the received panoramic image to the display device, wherein each camera unit includes a pair of a left-eye camera and a right-eye camera, the image processing device generates a left-eye panoramic image and a right-eye panoramic image based respectively on left-eye and right-eye images captured by the pairs of cameras and transmits the generated left-eye and right-eye panoramic images to the remote control device over wireless communications, the remote control device receives the left-eye and right-eye panoramic images from the image processing device and transmits parts of the received left-eye and right-eye panoramic images to the display device, the display device, designed to be mounted on the head of an operator, receives the parts of the left-eye and right-eye panoramic images from the remote control device and displays the received parts of the left-eye and right-eye panoramic images, as well as detects movement of the head of the operator and transmits the detected movement of the head of the operator to the remote control device, the remote control device adjusts the parts of the left-eye and right-eye panoramic images that are to be transmitted to the display device according to the movement of the head of the operator transmitted from the display device, and the display device displays, along with the parts of the left-eye and right-eye panoramic images, a part of work-assisting information that corresponds to the parts of the left-eye and right-eye panoramic images based on a database prepared in advance in the display system or a database located at a different location than the display system, in such a manner that the part of work-assisting information coincides with the parts of the left-eye and right-eye panoramic images.

In an exemplary aspect of the present invention, the plurality of camera units are located at disposition positions that correspond horizontally to a position of a seat that could be installed on the working machine, so that the plurality of camera units have centers of lenses thereof at a seated height that corresponds to a height of the eyes of a working person who, having an average physique for a target market of the working machine, is presumably seated on the seat.

In another exemplary aspect of the present invention, the plurality of camera units are provided on a support member capable of upward/downward movement and vertical rotation.

In another exemplary aspect of the present invention, the display system further includes an illumination device on a periphery of the plurality of camera units.

Advantageous Effects of Invention

The present invention can provide a display system for remote control of a working machine, the display system being capable of tracking movement of the line of sight of an operator to accordingly change the image being displayed on a display device.

DESCRIPTION OF EMBODIMENTS

The following will describe embodiments in accordance with the present invention in reference to drawings.

First Embodiment

Figure 1:
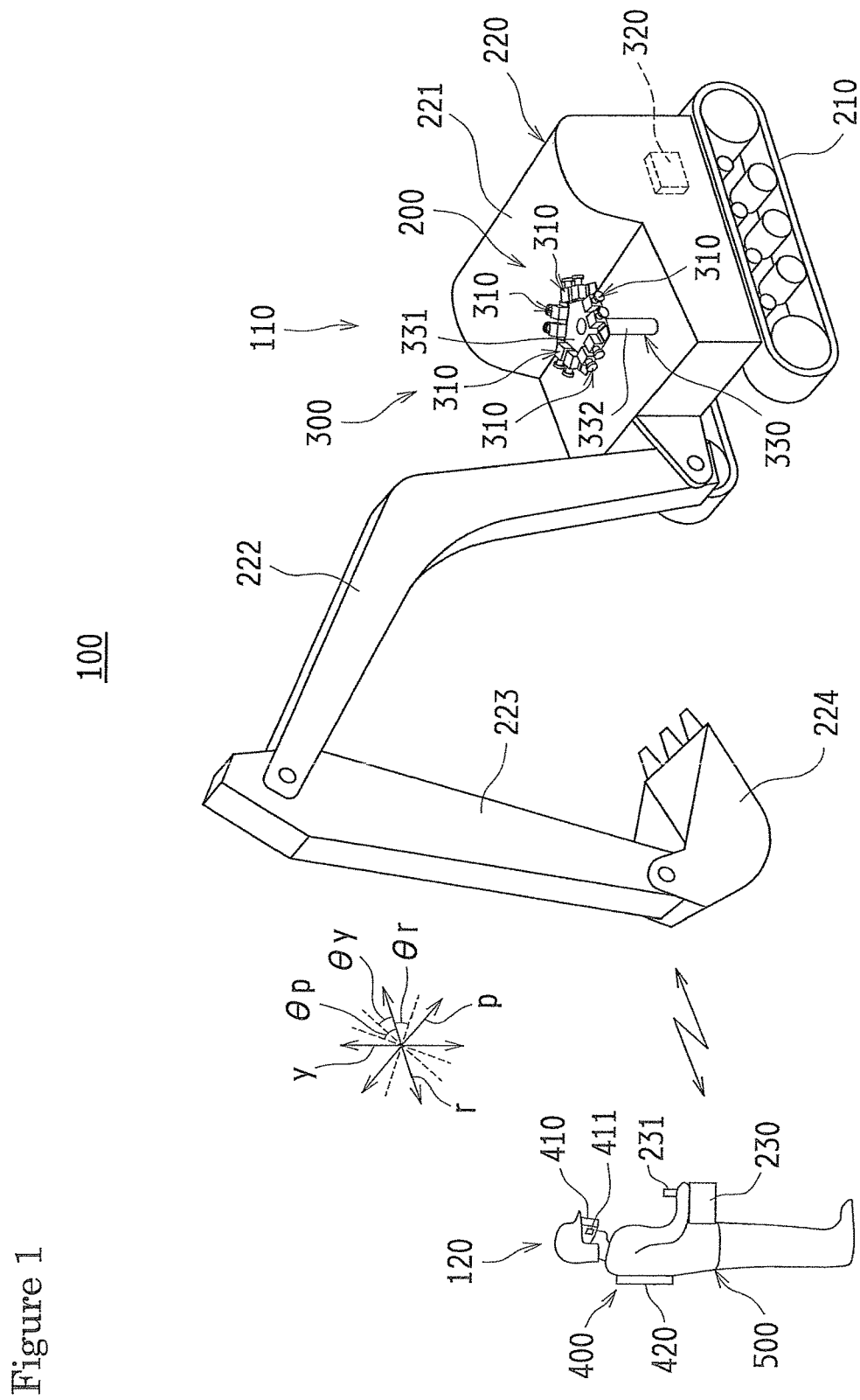
FIG. 1 is a schematic illustration of a display system for remote control of a working machine in accordance with a first embodiment.

FIG. 1 is a schematic illustration of a display system 100 for remote control of a working machine 200 in accordance with a first embodiment.

As illustrated in FIG. 1, the display system 100 for remote control of the working machine 200 includes camera units 310-310 attached to the working machine 200 and controlled remotely from a place located at a distance from a working site where the working machine 200 is at work. Images (movies) captured by the camera units 310-310 are transmitted to a remote control side 120 of the display system over wireless communications so that the captured images can be displayed on a display device 410 in the remote control side 120 in real time.

In the display system 100, the working machine 200 is an unmanned working machine controlled remotely from a place located at a distance from a working site by an operator 500 of the working machine 200. The operator 500, looking at the display screen of the display device 410, sends operational instructions from the remote control side 120 to control the unmanned working machine. The working machine 200 is thus enabled to work in dangerous working sites that humans cannot approach (e.g., due to contamination of the sites).

The working machine 200 includes a working component 220 capable of horizontal rotation and vertical swinging. In this example, the working machine 200 is a construction machine (specifically, an excavator). The working machine 200 includes also a traveling body 210 constituting a crawler. The working component 220 is capable of rotating horizontally (around an axis that extends in the vertical direction) relative to the traveling body 210. The working component 220 includes: an upper body 221 capable of rotating horizontally relative to the traveling body 210; a boom 222 capable of swinging vertically (around an axis that extends in the horizontal direction) relative to the upper body 221; an arm 223 capable of swinging vertically relative to the boom 222; and a bucket 224 capable of swinging vertically relative to the arm 223. The "horizontal" and "vertical" directions in this context are defined relative to the working machine 200 placed on a horizontal plane.

In this example, the attachment to the end of the arm 223 is the bucket 224. The example is however by no means limiting: any suitable attachment according to the nature of the work may be fitted to the end of the arm 223.

In this example, the working machine 200 is an excavator. The example is however by no means limiting: the working machine 200 may be any other construction machine or any agricultural machine.

The working machine 200 further includes a remote operation device 230. The remote operation device 230 remotely controls a main body of the working machine 200 and is capable of wireless communications with the main body of the working machine 200. The remote operation device 230 accepts operations from the operator 500 and transmits operational instructions based on the operations to the main body of the working machine 200 over wireless communications. The remote operation device 230 includes an operation section 231, for example, a control lever with which the working component 220 (specifically, the upper body 221, boom 222, arm 223, bucket 224, or any other component) is operated.

The display system 100 is composed of components 300 in the working machine side 110 of the display system and components 400 in the remote control side 120 of the display system.

The components 300 in the working machine side 110 include a plurality of camera units 310-310 and an image processing device 320, both being provided on the working machine 200. The components 400 in the remote control side 120 include a display device 410 and a remote control device 420.

The components 300 in the working machine side 110 further include a support member 330. The support member 330 has its lower end supported by the upper body 221 (in this example, fixed to the upper body 221) provided on the working component 220 of the working machine 200 and its upper end supporting (in this example, maintaining) the camera units 310-310 in a horizontal attitude. The "horizontal attitude" in this context is defined as the attitude of the working machine 200 when the working machine 200 is placed on a horizontal plane.

The support member 330 includes a support 331 and a support base (in this example, a post 332). The support 331 supports the camera units 310-310. The support base supports the support 331 on its upper end and is in turn supported by the upper body 221 on its lower end.

Figure 2:
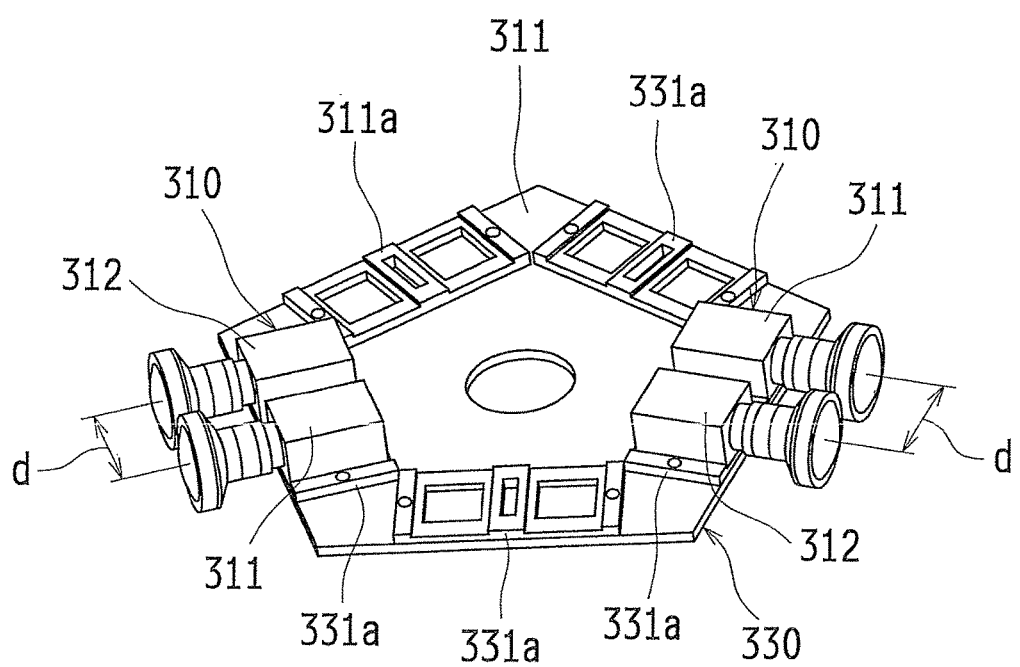
FIG. 2 is a schematic perspective view of the structure of a support in a support member provided on the working machine shown in FIG. 1 and a plurality of camera units supported by that support.

FIG. 2 is a schematic perspective view of the structure of the support 331 in the support member 330 provided on the working machine 200 shown in FIG. 1 and the camera units 310-310 supported by that support 331. FIG. 2 shows some of the (five, in this example) camera units 310-310 disposed on the support 331 being removed from the support 331; in actuality, all of the (five, in this example) camera units 310-310 are disposed on the support 331.

As illustrated in FIG. 2, each camera unit 310-310 is composed of a pair of a left-eye camera 311 and a right-eye camera 312. More specifically, the pair of cameras 311 and 312 are composed of the left-eye camera 311 for use with the left eye of the operator 500 and the right-eye camera 312 for use with the right eye of the operator 500. The pair of cameras 311 and 312 have centers of lenses thereof being separated by a distance "d" that is equal to the distance between the centers of an average person's pupils. In this example, all the cameras 311 and 312 constituting the camera units 310-310 are compact digital video cameras of the same type.

The support 331 is structured to omnidirectionally or substantially omnidirectionally support the camera units 310-310 so that the images captured by the camera units 310-310 can overlap at a predetermined captured area ratio. Specifically, the support 331 is structured to omnidirectionally or substantially omnidirectionally support the left-eye cameras 311-311 so that the left-eye images captured by the left-eye cameras 311-311 can overlap at a predetermined captured area ratio and to omnidirectionally or substantially omnidirectionally support the right-eye cameras 312-312 so that the right-eye images captured by the right-eye cameras 312-312 can overlap at a predetermined captured area ratio.

More specifically, when there are provided two camera units 310 and 310, the support 331 may allow arranging the camera units 310 and 310 at opposite positions separated by a predetermined distance; when there are provided three or more camera units 310-310, the support 331 may allow arranging the camera units 310-310 radially at equally or substantially equally separated positions along an imaginary circle with a radius of a predetermined length.

Specifically, the support 331 is platelike and may be shaped to have a number of sides that matches the number of camera units 310. For example, when there are provided two camera units 310 and 310, the support 331 may have an increased length in a direction in which the camera units 310 and 310 are arranged back to back in a plan view; when there are provided three or more camera units 310-310, the support 331 may have a regular polygonal shape with the same number of sides of an equal length as the number of camera units 310 (specifically, when there are provided three camera units 310-310, the support 331 may have a regular triangular shape in a plan view; when there are provided four camera units 310-310, the support 331 may have a regular square shape in a plan view; when there are provided five camera units 310-310, the support 331 may have a regular pentagonal shape in a plan view; etc.). Alternatively, the support 331 may be circular in a plan view.

In this example, there are provided five camera units 310-310 (in other words, there are provided a total of ten cameras 311 and 312 constituting the camera units 310-310). These camera units 310-310 are arranged radially at equally or substantially equally separated positions (the center of each side) along an imaginary circle with a radius of a predetermined length as measured from the center of the support 331 that is pentagonal in a plan view. The camera units 310-310 are fixed using fixing members 331a.

As detailed above, the support 331 supports the camera units 310-310 arranged at opposite positions or radially at equally or substantially equally separated positions. The arrangement enables the camera units 310-310 as a whole to pan covering a 360° horizontal view. The angle of view of each pair of cameras 311 and 312 constituting the camera units 310-310 may be determined in a suitable manner according to the disposition positions of the camera units 310-310. In this example, each pair of cameras 311 and 312 has a vertical angle of view of 140° (specifically, 70° above an imaginary horizontal reference plane and another 70° below that plane).

The camera units 310-310 (see FIG. 1) are located at disposition positions that correspond horizontally (specifically, both in the front/back direction and the left/right direction) to a position of a seat that could be installed on the working machine 200 (in this example, the seat on which a working person would be seated during operation if the working machine 200 is manned). In addition, the camera units 310-310 are arranged so as to have centers of lenses thereof at a seated height that corresponds to the height of the eyes of a working person (e.g., a working person from Europe, the U.S., or Asia) who, having an average physique (e.g., height and sitting height) for a target market of the working machine 200 (e.g., specifications for the European, North American, or Asian market), is presumably seated on the seat that could be installed on the working machine 200.

In this example, in the front of the upper body 221, the boom 222 is provided at the center of the upper body 221 in terms of the left/right direction for a person facing the traveling direction. The support member 330 is hence erected near the front of the upper body 221 either to the right or left of the center in terms of the left/right direction (to the left in the example in FIG. 1).

The support member 330 is further structured to support the camera units 310-310 so that the camera units 310-310 have centers of lenses thereof at a height that corresponds to the height of the eyes of a working person presumably seated on the seat that could be installed on the working machine 200.

The image processing device 320, in this example, is provided in the working component 220 of the working machine 200. This example is however by no means limiting: the image processing device 320 may be provided in the support member 330, the traveling body 210, or any other suitable member.

The image processing device 320 generates panoramic images (panoramic movie data) based on a plurality of images (movie data) captured by the camera units 310-310, cuts out parts of the generated panoramic images, and transmits the cut-out parts of the panoramic images over wireless communications. The image processing device 320, in this example, is built around a computer (specifically, a personal computer).

Figure 3:
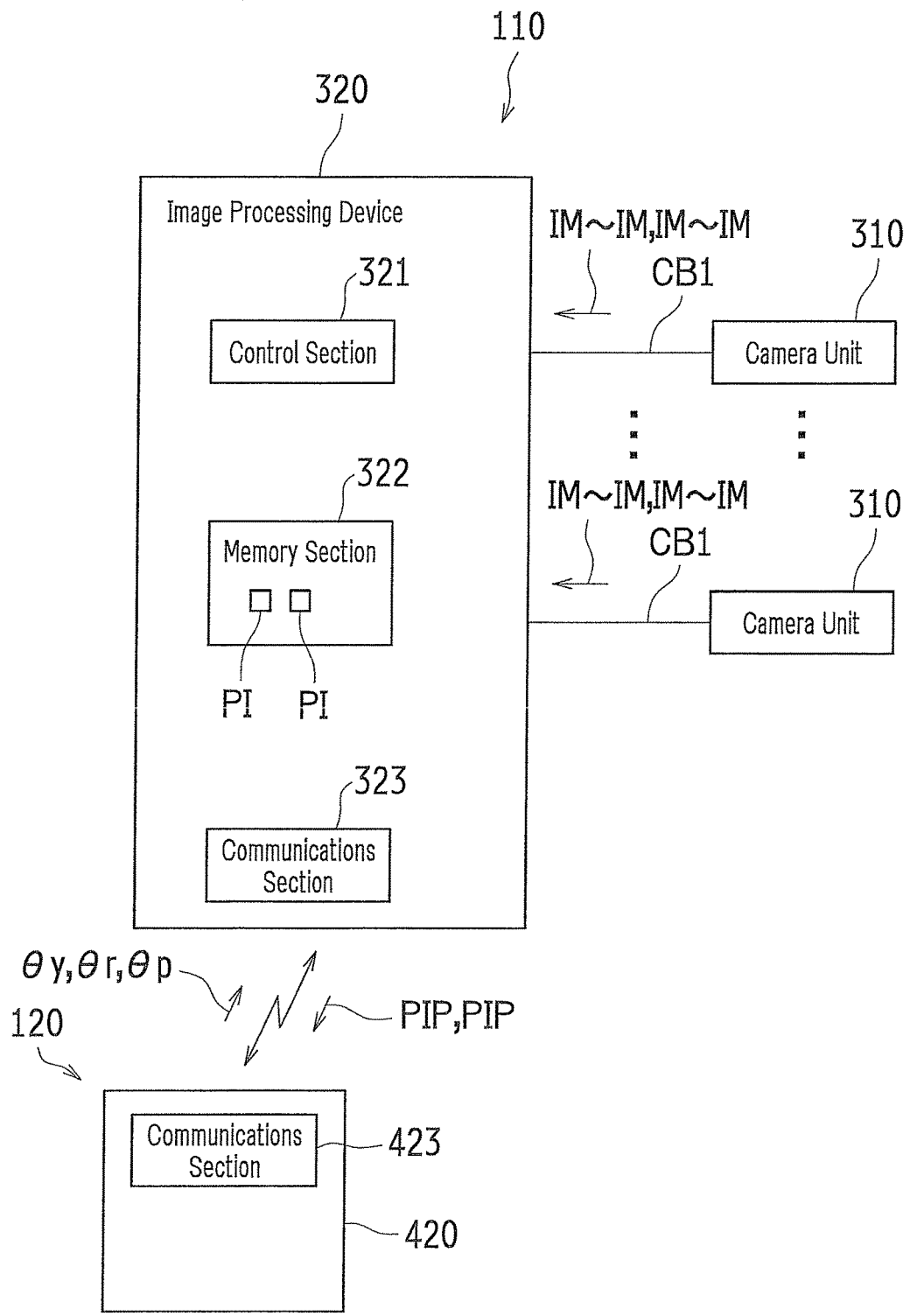
FIG. 3 is a block diagram showing a system configuration for an image processing device provided in the working machine side of the display system in accordance with the first embodiment.

FIG. 3 is a block diagram showing a system configuration for the image processing device 320 in the working machine side 110 of the display system 100 in accordance with the first embodiment.

As illustrated in FIG. 3, the image processing device 320 includes a control section 321 executing various programs, computing, and other processes and a memory section 322 storing various data.

The image processing device 320 has a predetermined communication interface for communications with the camera units 310-310 and is electrically connected to the camera units 310-310 via a communication interface connecting cable CB1. This configuration enables the image processing device 320 to receive a plurality of images (movie data) IM-IM and IM-IM captured by the camera units 310-310.

The communication interface between the camera units 310-310 and the image processing device 320 is, in this example, a USB (universal serial bus) interface (specifically, USB 3.0 compatible interface). The communication interface between the camera units 310-310 and the image processing device 320 is by no means limited to a USB interface and may be any other communication interface. In addition, the communications between the camera units 310-310 and the image processing device 320 are by no means limited to wired communications and may be short-range wireless communications.

The memory section 322 contains a RAM (random access memory) or like volatile memory and a hard disk device, flash memory, or like non-volatile memory. The volatile memory is used, for example, as a working memory by the control section 321 as required in the execution of various computing and other processes. The non-volatile memory is preloaded (pre-installed) with software, including computer programs, that come from an external resource (e.g., a storage medium or an Internet server).

The image processing device 320 further includes a communications section 323 that performs wireless communications (in this example, short-range wireless communications) with a communications section 423 in the remote control device 420 in the remote control side 120.

Examples of short-range wireless communications include technology capable of short-range communications (approximately from a few meters to 100 meters): namely, wireless LAN (local area network) communications capable of short-range communications over a range of approximately from a few tens of meters to 100 meters and wireless PAN (personal area network) communications capable of short-range communications over a range of approximately from a few meters to a few tens of meters.

An example of wireless LAN communications is IEEE 802.11 compatible wireless LAN communications. An example of wireless PAN communications is IEEE 802.15 compatible wireless PAN communications.

The communications section 323 transmits/receives data to/from the communications section 423 in the remote control device 420 by short-range wireless communications. In this example, the communications section 323 performs IEEE 802.11 compatible wireless LAN communications.

The communications between the image processing device 320 and the remote control device 420 are by no means limited to short-range wireless communications and may be long-range (more than approximately 100 m) wireless communications.

The image processing device 320 generates left-eye and right-eye panoramic images (panoramic movies) PI based respectively on the left-eye and right-eye images (movies) IM-IM and IM-IM captured by the pairs of cameras 311-311 and 312-312 constituting the camera units 310-310.

Panoramic images are generated by the following technique as an example. For the left eye, a left-eye panoramic image (panoramic movie) PI is generated by combining frame by frame the left-eye images IM-IM captured by the left-eye cameras 311-311 that are arranged omnidirectionally or substantially omnidirectionally to capture overlapping images IM-IM, so as to synthesize a common image in which the left-eye images IM-IM are overlapping. Likewise, for the right eye, a right-eye panoramic image (panoramic movie) PI is generated by combining frame by frame the right-eye images IM-IM captured by the right-eye cameras 312-312 that are arranged omnidirectionally or substantially omnidirectionally to capture overlapping images IM-IM, so as to synthesize a common image in which the right-eye images IM-IM are overlapping. Any publicly known, conventional technique may be used to generate panoramic images PI and PI; for this reason, no further details are given here.

The image processing device 320 stores the generated left-eye and right-eye panoramic images PI and PI temporarily in the memory section 322.

The image processing device 320 implements a cut-out process to cut out a part PIP of the left-eye panoramic image PI stored in the memory section 322 and a part PIP of the right-eye panoramic image PI stored in the memory section 322.

Figure 4:
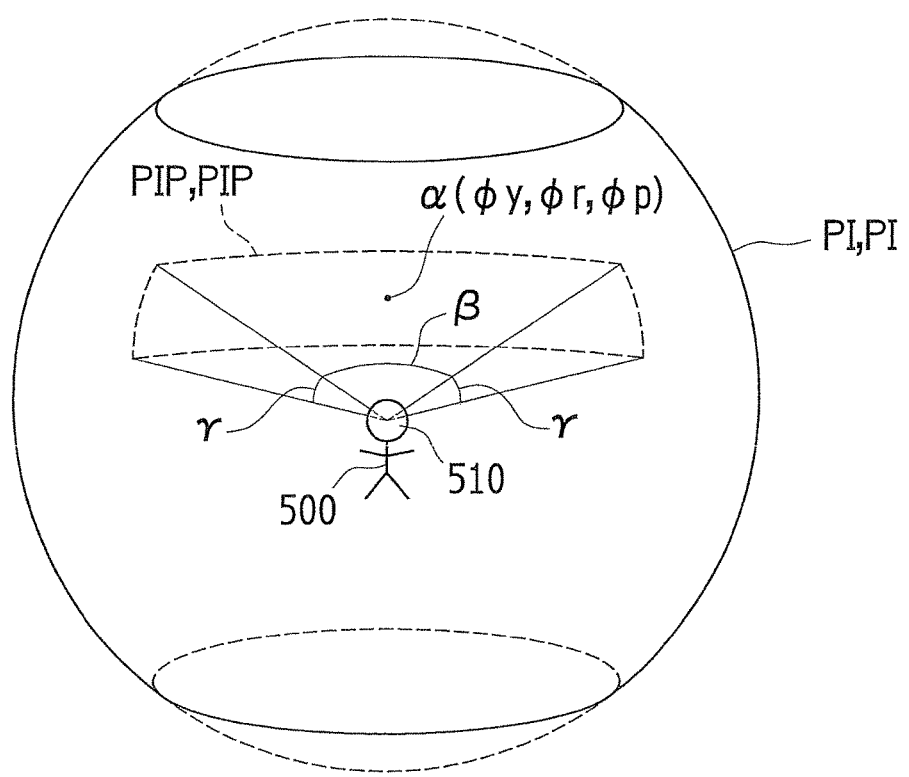
FIG. 4 is a diagram showing a cut-out process in which the image processing device cuts out parts of panoramic images.

FIG. 4 is a diagram showing the cut-out process in which the image processing device 320 cuts out parts PIP and PIP from panoramic images PI and PI. The left-eye and right-eye panoramic images PI and PI have practically the same configuration. FIG. 4, not distinguishing between the left-eye and right-eye panoramic images PI and PI, illustrates the cut-out process collectively for both left-eye and right-eye images.

It would be easier to understand the cut-out process in which the image processing device 320 cuts out parts PIP and PIP from panoramic images PI and PI if the head 510 of the operator 500 is located at the center of a hollow sphere on the inside of which the panoramic images PI and PI are arranged omnidirectionally or substantially omnidirectionally (in this example, substantially omnidirectionally) as illustrated in FIG. 4.

The image processing device 320 cuts out the parts PIP and PIP from the panoramic images PI and PI with predetermined cut-out angles (ß and γ) that correspond to the view angle of the operator 500 by using a predetermined reference point α (e.g., a forward yawing reference angle φy, rolling reference angle φr, or pitching reference angle φp of the working machine 200) as a reference point. Cut-out angle (ß and γ) settings are made and stored in advance in the memory section 322.

The predetermined reference point α, for example, when one of the camera units 310-310 is located near the front of the working machine 200, may be the center pixel of the entire pixel region of an image transmitted from that camera unit 310 located near the front of the working machine 200. In addition, the predetermined cut-out angles (ß and γ) may match the angles that are less than or equal to the angle of view of an average person. For example, the horizontal cut-out angle ß may be approximately less than or equal to 200°, and the vertical cut-out angle γ may be approximately less than or equal to 125° (specifically, 75° below and 50° above an imaginary horizontal reference plane).

The image processing device 320 (see FIG. 3) transmits the cut-out part PIP of the left-eye panoramic image (panoramic movie data) PI and the cut-out part PIP of the right-eye panoramic image (panoramic movie data) PI to the remote control device 420 in the remote control side 120 over wireless communications. More specifically, the image processing device 320 compresses the cut-out parts PIP and PIP of the left-eye and right-eye panoramic images PI and PI and transmits them to the remote control device 420 over wireless communications in real time. In this example, the data transmitted over wireless communications is encrypted.

The remote control device 420 in the remote control side 120 receives the parts PIP and PIP of the left-eye and right-eye panoramic images PI and PI from the image processing device 320 and transmits the received parts PIP and PIP of the left-eye and right-eye panoramic images PI and PI to the display device 410. The remote control device 420, in this example, is a computer (in this example, a tablet computer).

Figure 5:
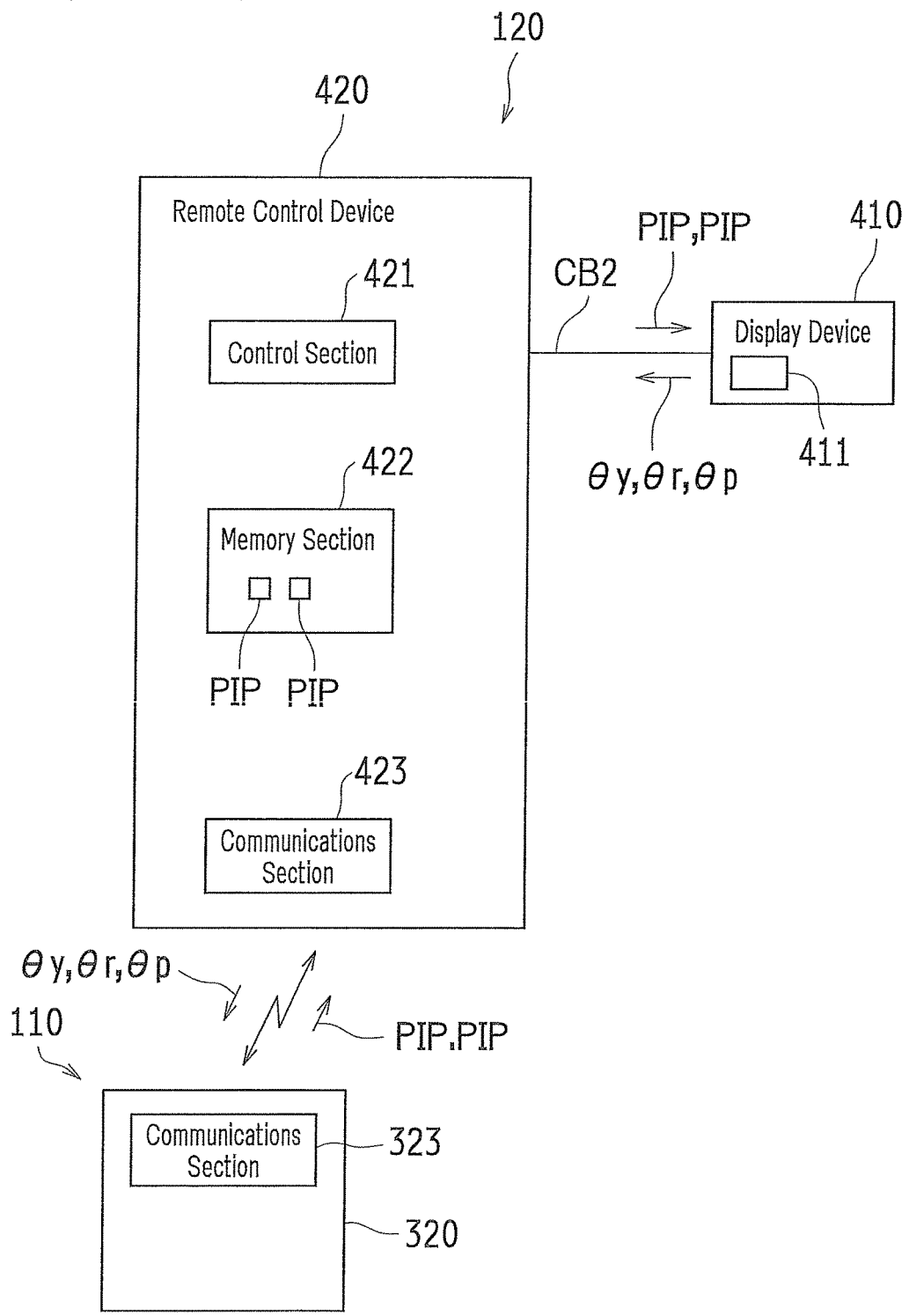
FIG. 5 is a block diagram showing a system configuration for a remote control device provided in a remote control side of the display system in accordance with the first embodiment.

FIG. 5 is a block diagram showing a system configuration for the remote control device 420 in the remote control side 120 of the display system 100 in accordance with the first embodiment.

As illustrated in FIG. 5, the remote control device 420 includes a control section 421 executing various programs, computing, and other processes and a memory section 422 storing various data.

The remote control device 420 has a predetermined communication interface for communications with the display device 410 and is electrically connected to the display device 410 via a communication interface connecting cable CB2. This configuration enables the remote control device 420 to transmit the parts PIP and PIP of the left-eye and right-eye panoramic images PI and PI to the display device 410.

The communication interface between the remote control device 420 and the display device 410 is, in this example, an HDMI (high-definition multimedia interface). The communication interface between the remote control device 420 and the display device 410 is by no means limited to an HDMI and may be any other communication interface. In addition, the communications between the remote control device 420 and display device 410 are by no means limited to wired communications and may be short-range wireless communications.

The memory section 422 contains a RAM or like volatile memory and a flash memory or like non-volatile memory. The volatile memory is used, for example, as a working memory by the control section 421 as required in the execution of various computing and other processes. The non-volatile memory is preloaded (pre-installed) with software, including computer programs, that come from an external resource (e.g., a storage medium or an Internet server).

The remote control device 420 further includes a communications section 423 that performs wireless communications (in this example, short-range wireless communications) with the communications section 323 in the image processing device 320 in the working machine side 110.

The wireless communications performed by the communications section 423 in the remote control device 420 are the same as the wireless communications performed by the communications section 323 in the image processing device 320; for this reason, no further details are given here.

The remote control device 420, in this example, is a tablet computer and alternatively may be any other mobile terminal device, for example, a notebook computer, a multifunctional mobile phone handset ("smartphone"), a watch-like terminal device, or a wearable device (a terminal device that can be attached to clothes). The remote control device 420 may be provided in the display device 410. The remote control device 420 is by no means limited to a mobile terminal device and may be a desktop computer. The operator 500 may be either standing or seated while remotely controlling the working machine 200.

More specifically, the remote control device 420 stores the received parts PIP and PIP of the left-eye and right-eye panoramic images PI and PI temporarily in the memory section 422 and at the same time transmits them to the display device 410.

The display device 410 in the remote control side 120 receives the parts PIP and PIP of the left-eye and right-eye panoramic images PI and PI from the remote control device 420 and at the same time displays them. More specifically, the display device 410 performs a streaming replay in which the display device 410 simultaneously receives and reproduces (displays) the parts PIP and PIP of the left-eye and right-eye panoramic images (panoramic movies) PI and PI transmitted in real time from the remote control device 420.

This configuration enables the display device 410 to realize a real-time (live), three-dimensional display ("3D image" or "stereoscopic image"). Any publicly known, conventional technique may be used to realize a three-dimensional display on the display device 410; for this reason, no further details are given here.

The display device 410 (see FIG. 1) is, in this example, mounted on the head 510 of the operator 500 (specifically, in front of the eyes). More specifically, the display device 410 is an HMD (head-mounted display). The display device 410 is by no means limited to a head-mounted display (HMD) and may be a desktop display device (monitor) or a video projector.

The components 400 in the remote control side 120 further include a line-of-sight detecting section 411 (see FIGS. 1 and 5) that detects movement of the line of sight of the operator 500. In this example, the line-of-sight detecting section 411 is an attitude detecting section that detects the attitude of the head 510 of the operator 500 (see FIG. 1).

The line-of-sight detecting section 411 is mounted on the head 510 of the operator 500 as illustrated in FIG. 1 and is capable of detecting a yawing angle θy around a y-axis which extends in the vertical direction with respect to the head 510 of the operator 500, a rolling angle θr around an r-axis which extends in the front/back direction with respect to the head 510 of the operator 500, and a pitching angle θp around a p-axis which extends in the left/right direction with respect to the head 510 of the operator 500, using the reference attitude of the head 510 (e.g., the attitude of the head 510 when the operator 500 is looking in the horizontal direction) as a reference. Reference values may be specified for the reference attitude prior to the detection of the attitude of the head 510 of the operator 500.

The line-of-sight detecting section 411, when it is an attitude detecting section as in the current example, may be, for example, one of various sensors including three-dimensional gyrosensors, three-dimensional gravitational acceleration sensors, rotary encoders, and potentiometers. The line-of-sight detecting section 411 may be publicly known, conventional one; for this reason, no further details are given here.

The line-of-sight detecting section 411 (see FIG. 5) transmits data on the detected movement of the head 510 of the operator 500 (specifically, the yawing angle θy, rolling angle θr, and pitching angle θp with respect to the reference attitude of the head 510) to the remote control device 420.

In the present embodiment, the line-of-sight detecting section 411 is provided in the display device 410. In other words, the display device 410 includes the line-of-sight detecting section 411 to detect movement of the head 510 of the operator 500 (specifically, the yawing angle θy, rolling angle θr, and pitching angle θp with respect to the reference attitude of the head 510) using the line-of-sight detecting section 411 and transmits data on the movement of the head 510 of the operator 500 detected by the line-of-sight detecting section 411 (specifically, the yawing angle θy, rolling angle θr and pitching angle θp with respect to the reference attitude of the head 510) to the remote control device 420.

The transmission of the movement of the head 510 of the operator 500 from the line-of-sight detecting section 411 (in this example, the display device 410) to the remote control device 420 may be performed by communications similar to the communications between the remote control device 420 and the display device 410. The transmission of the movement of the head 510 of the operator 500 from the line-of-sight detecting section 411 (in this example, the display device 410) to the remote control device 420 is by no means necessarily performed by wired communications and may be performed by short-range wireless communications.

The remote control device 420 transmits, to the image processing device 320 in the working machine side 110 over wireless communications, the data on the movement of the head 510 of the operator 500 (specifically, the yawing angle θy, rolling angle θr, and pitching angle θp with respect to the reference attitude of the head 510) transmitted from the line-of-sight detecting section 411 (in this example, the display device 410).

The image processing device 320 in the working machine side 110 receives the data on the movement of the head 510 of the operator 500 (specifically, the yawing angle θy, rolling angle θr, and pitching angle θp with respect to the reference attitude of the head 510) from the remote control device 420 and adjusts the parts PIP and PIP of the left-eye and right-eye panoramic images PI and PI that are to be transmitted to the display device 410 according to the received movement of the head 510 of the operator 500 (specifically, the yawing angle θy, rolling angle θr, and pitching angle θp with respect to the reference attitude of the head 510).

Figure 6:
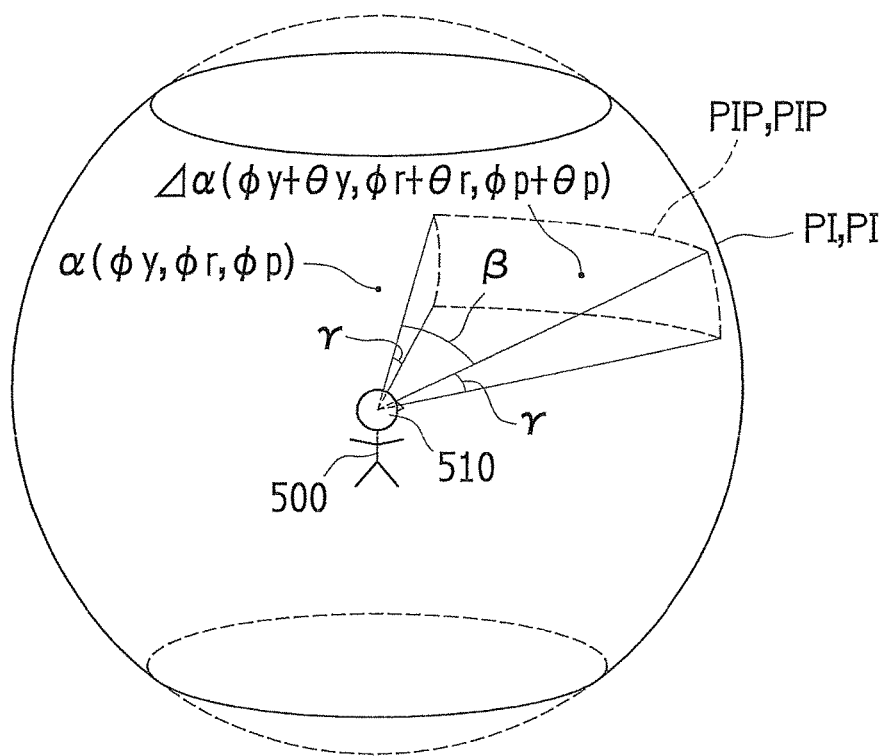
FIG. 6 is a diagram showing an adjusting process in which the image processing device adjusts parts of panoramic images according to movement of the head of an operator.

FIG. 6 is a diagram showing an adjusting process in which the image processing device 320 adjusts parts PIP and PIP of panoramic images PI and PI according to movement of the head 510 of the operator 500. The left-eye and right-eye panoramic images PI and PI have practically the same configuration. FIG. 6, not distinguishing between the left-eye and right-eye panoramic images PI and PI, illustrates the adjusting process collectively for both left-eye and right-eye images.

It would be easier to understand the adjusting process in which the image processing device 320 adjusts parts PIP and PIP of panoramic images PI and PI according to the movement of the head 510 of the operator 500 if the head 510 of the operator 500 is located at the center of a hollow sphere on the inside of which the panoramic images PI and PI are arranged omnidirectionally or substantially omnidirectionally (in this example, substantially omnidirectionally) as illustrated in FIG. 6.

The image processing device 320 calculates, for each panoramic images PI and PI, a relative reference point Δα (e.g., a relative yawing reference angle φy+θy, relative rolling reference angle φr+θr, and relative pitching reference angle φp+θp for a reference point in the front of the working machine 200) that is displaced from a predetermined reference point α (e.g., a forward yawing reference angle φy, rolling reference angle φr, or pitching reference angle φp of the working machine 200) by the received movement of the head 510 of the operator 500 (specifically, the yawing angle θy, rolling angle θr and pitching angle θp with respect to the reference attitude of the head 510).

The image processing device 320 cuts out parts PIP and PIP of the adjusted panoramic images PI and PI. More specifically, the image processing device 320 cuts out parts PIP and PIP from panoramic images PI and PI with cut-out angles (ß and γ) that correspond to the view angle of the operator 500 by using the calculated relative reference point Δα as a reference.

In this example, the line-of-sight detecting section 411 is an attitude detecting section that detects the attitude of the head 510 of the operator 500 and alternatively may be a line-of-sight detecting section that detects the line of sight (eyeballs' movement) of the operator 500. In the latter case, if the line-of-sight detecting section responds too rapidly to a change of the line of sight of the operator 500, the image processing device 320 may implement the adjusting process or the cut-out process by delaying the response of the line-of-sight detecting section.

Figure 7:
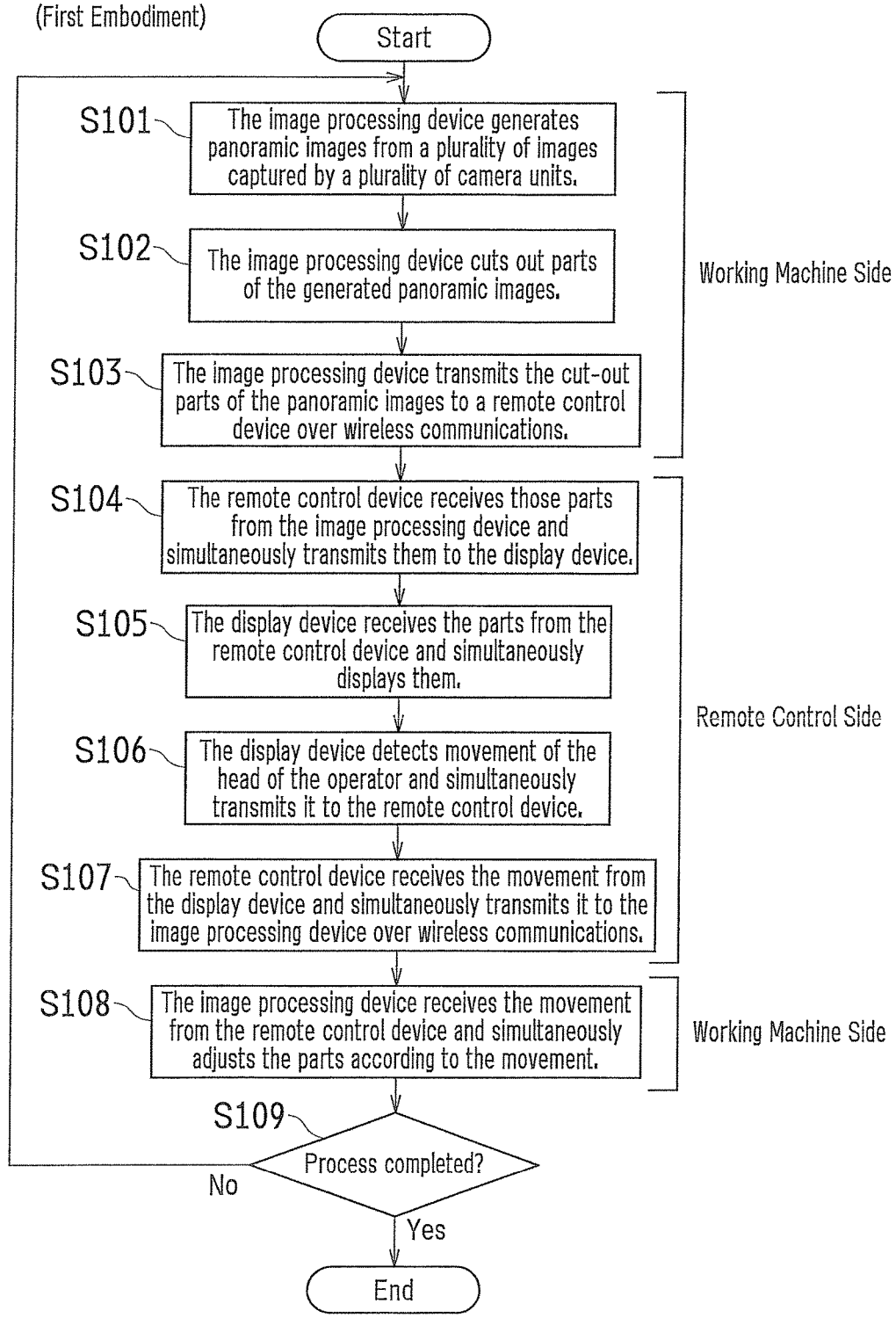
FIG. 7 is a flow chart depicting an exemplary control operation implemented by the display system in accordance with the first embodiment.

FIG. 7 is a flow chart depicting an exemplary control operation implemented by the display system 100 in accordance with the first embodiment.

In the control operation implemented by the display system 100 in accordance with the first embodiment, the image processing device 320 in the working machine side 110 first generates panoramic images PI and PI from a plurality of images IM-IM and IM-IM captured by the camera units 310-310 as illustrated in FIG. 7 (step S101).

Next, the image processing device 320 implements a cut-out process to cut out parts PIP and PIP of the generated panoramic images PI and PI (step S102).

Next, the image processing device 320 transmits the cut-out parts PIP and PIP of the panoramic images PI and PI to the remote control device 420 in the remote control side 120 over wireless communications (step S103).

Next, the remote control device 420 in the remote control side 120 receives the parts PIP and PIP of the panoramic images PI and PI from the image processing device 320 in the working machine side 110 and simultaneously transmits those parts to the display device 410 (step S104).

Next, the display device 410 simultaneously receives and displays the parts PIP and PIP of the panoramic images PI and PI transmitted from the remote control device 420 (step S105).

Next, the display device 410 detects the movement of the head 510 of the operator 500 and simultaneously transmits that movement to the remote control device 420 (step S106).

Next, the remote control device 420 receives the movement of the head 510 of the operator 500 from the display device 410 and simultaneously transmits that movement to the image processing device 320 in the working machine side 110 over wireless communications (step S107).

Next, the image processing device 320 in the working machine side 110 receives the movement of the head 510 of the operator 500 from the remote control device 420 in the remote control side 120 and simultaneously adjusts the parts PIP and PIP of the panoramic images PI and PI according to the movement of the head 510 (step S108).

The display system 100 in accordance with the first embodiment then repeats steps S101 to S108 above until the process is completed (step S109).

In the display system 100 in accordance with the first embodiment described above, the image processing device 320 adjusts the parts PIP and PIP of the left-eye and right-eye panoramic images PI and PI that are to be transmitted to the display device 410 according to the movement of the head 510 of the operator 500 transmitted from the remote control device 420. The display system 100 hence can adjust the three-dimensional view being displayed on the display device 410 according to the movement of the head 510 of the operator 500 and can therefore change the image being displayed on the display device 410 by tracking movement of the line of sight of the operator 500. This configuration can improve remote control operability. Furthermore, the image processing device 320 transmits the parts PIP and PIP of the panoramic images PI and PI to the remote control device 420 over wireless communications. The display system 100 can hence reduce traffic for wireless communications when compared with cases where complete panoramic images PI and PI are transmitted to the remote control device 420 over wireless communications.

A display system in which a single camera itself is moved to display an image on the display device needs time to move the camera when the image being displayed on the display device is to be changed.

In contrast, the display system 100 in accordance with the first embodiment can eliminate the time delay that inevitably occurs in moving the cameras when compared with cases where the display system is configured to move a camera to display an image on the display device because the image processing device 320 stores panoramic images PI and PI (omnidirectional images or substantially omnidirectional images).

In addition, in the first embodiment, the camera units 310-310 are located at disposition positions that correspond horizontally (specifically, both in the front/back direction and the left/right direction) to a position of a seat that could be installed on the working machine 200 and so that the camera units 310-310 have centers of lenses thereof at a seated height that corresponds to the height of the eyes of a working person who, having an average physique (e.g., height and sitting height) for a target market of the working machine 200, is presumably seated on the seat. The display device 410 can hence display parts PIP and PIP of panoramic images PI and PI that are similar to the real view that the working person seated on the seat would see.

Second Embodiment

Figure 8:
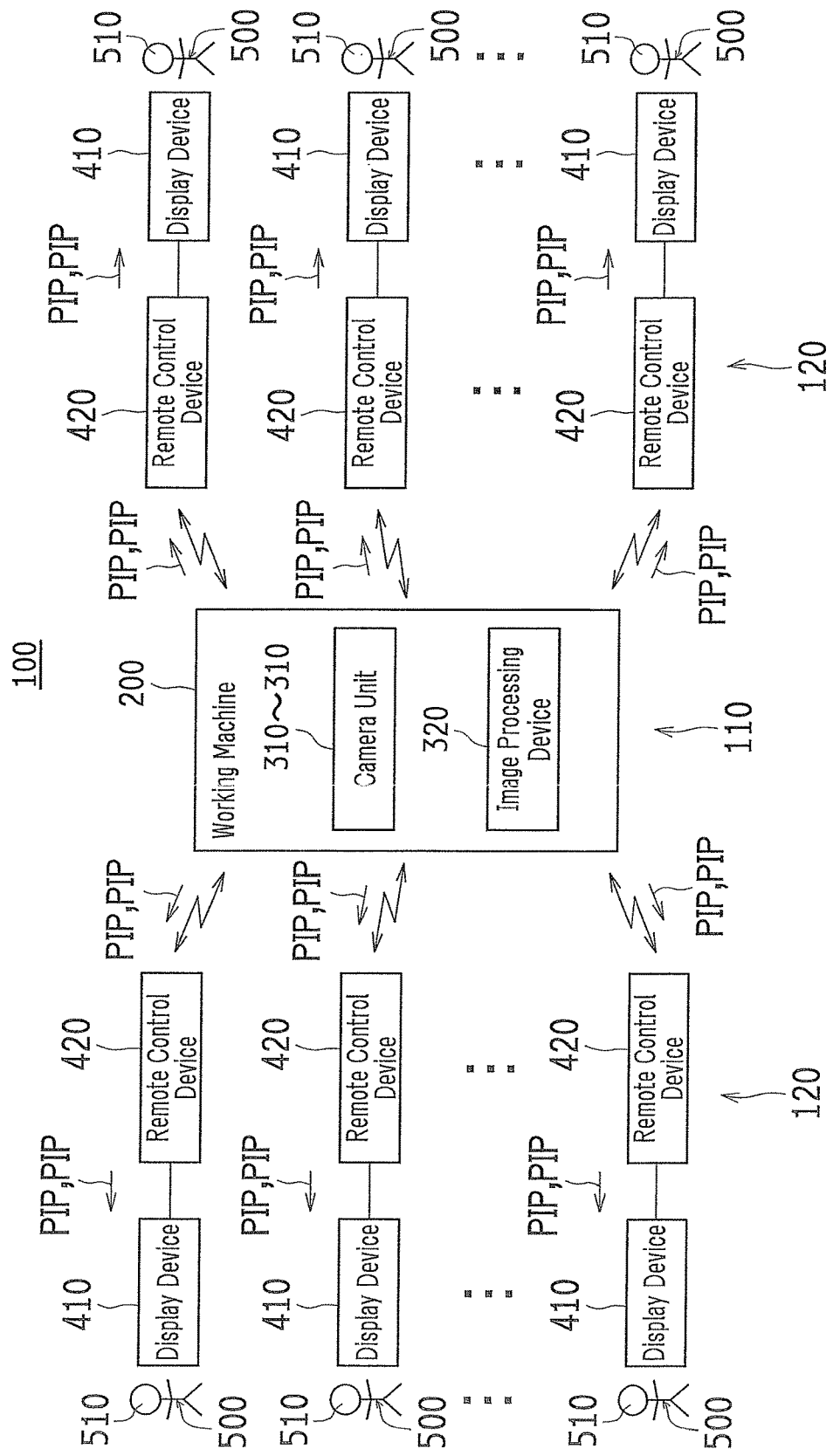
FIG. 8 is a schematic illustration of a display system for remote control of the working machine in accordance with a second embodiment.

FIG. 8 is a schematic illustration of a display system 100 for remote control of the working machine 200 in accordance with a second embodiment.

As illustrated in FIG. 8, the display system 100 in accordance with the second embodiment differs from the display system 100 in accordance with the first embodiment in that the remote control device 420 in the remote control side 120 is replaced with a plurality of remote control devices 420-420 and that the display device 410 is replaced with a plurality of display devices 410-410 that correspond respectively to the remote control devices 420-420.

Those members in the display system 100 in accordance with the second embodiment that are practically the same as those in the display system 100 in accordance with the first embodiment are indicated by the same reference numerals. Description will focus on differences from the display system 100 in accordance with the first embodiment.

The image processing device 320 in the working machine side 110 cuts out parts PIP-PIP and PIP-PIP of panoramic images PI and PI and transmits the cut-out parts PIP-PIP and PIP-PIP of the panoramic images PI and PI to the remote control devices 420-420 in the remote control side 120 over wireless communications. The communications between the image processing device 320 in the working machine side 110 and the remote control devices 420-420 in the remote control side 120 are capable of multiplex communications in which a plurality of signals are simultaneously transmitted over a single communications channel. The multiplex communications are by no means limited: examples include FDM (frequency division multiplexing) communications, TDM (time division multiplexing) communications, and other multiplex communications.

The remote control devices 420-420 in the remote control side 120 receive parts PIP-PIP and PIP-PIP of panoramic images PI and PI from the image processing device 320 and transmit the received parts PIP-PIP and PIP-PIP of the panoramic images PI and PI to the associated display devices 410-410.

The display devices 410-410 in the remote control side 120 receive parts PIP-PIP and PIP-PIP of panoramic images PI and PI from the associated remote control devices 420-420 and display the received parts PIP-PIP and PIP-PIP of the panoramic images PI and PI. A plurality of line-of-sight detecting sections 411-411 (in this example, a plurality of display devices 410-410) detect movement of the heads 510-510 of the associated operators 500-500 and transmit the detected movement of the heads 510-510 of the operators 500-500 to the associated remote control devices 420-420. The remote control devices 420-420 transmit, to the image processing device 320 over wireless communications, the movement of the heads 510-510 of the operators 500-500 transmitted from the associated line-of-sight detecting sections 411-411 (in this example, the display devices 410-410).

The image processing device 320 in the working machine side 110 adjusts the parts PIP-PIP and PIP-PIP of the panoramic images PI and PI according to the movement of the heads 510-510 of the operators 500-500 transmitted from the remote control devices 420-420.

The image processing device 320 cuts out the adjusted parts PIP-PIP and PIP-PIP of the panoramic images PI and PI from the panoramic images PI and PI.

The flow of processes implemented by the display system 100 in accordance with the second embodiment is practically the same as the flow of processes implemented by the display system 100 in accordance with the first embodiment shown in FIG. 7, except that the remote control device 420 is replaced with the remote control devices 420-420 and that the display device 410 is replaced with the display devices 410-410; for this reason, no further details are given here.

In the display system 100 in accordance with the second embodiment, the operators 500-500 can simultaneously view images being displayed on their individual display devices 410-410 in the fields of view that they want. This configuration can improve work safety when compared with cases where a single operator 500 is viewing an image being displayed on his/her display device 410 as in the first embodiment.

Third Embodiment

The display system 100 in accordance with a third embodiment differs from the display system 100 in accordance with the first embodiment in that it is the remote control device 420 in the remote control side 120, not the image processing device 320 in the working machine side 110, that implements a cut-out process on panoramic images PI and PI and an adjusting process on parts PIP and PIP of panoramic images PI and PI.

Those members in the display system 100 in accordance with the third embodiment that are practically the same as those in the display system 100 in accordance with the first embodiment are indicated by the same reference numerals. Description will focus on differences from the display system 100 in accordance with the first embodiment.

Figure 9:
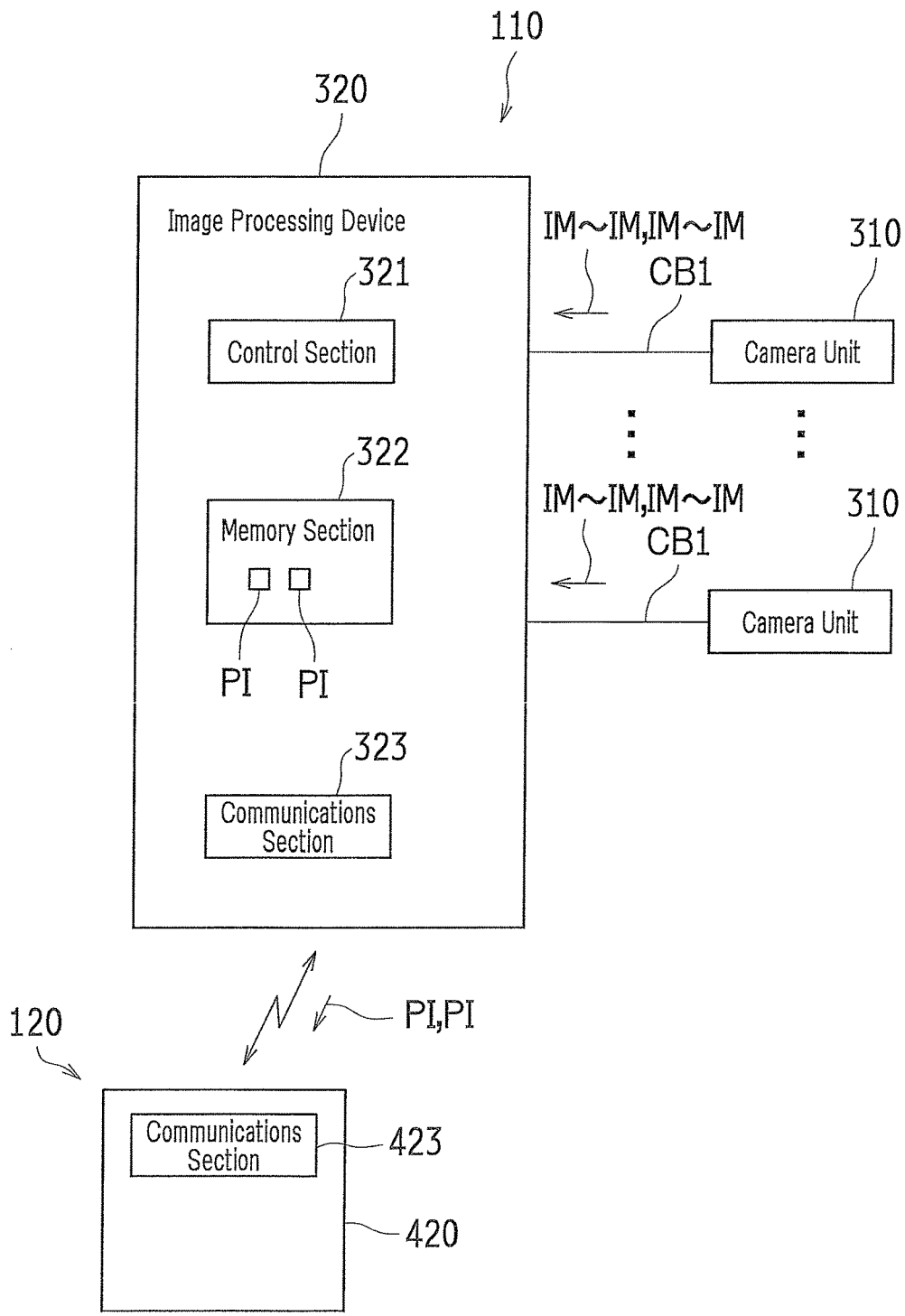
FIG. 9 is a block diagram showing a system configuration for an image processing device provided in the working machine side of a display system for remote control of the working machine in accordance with a third embodiment.
Figure 10:
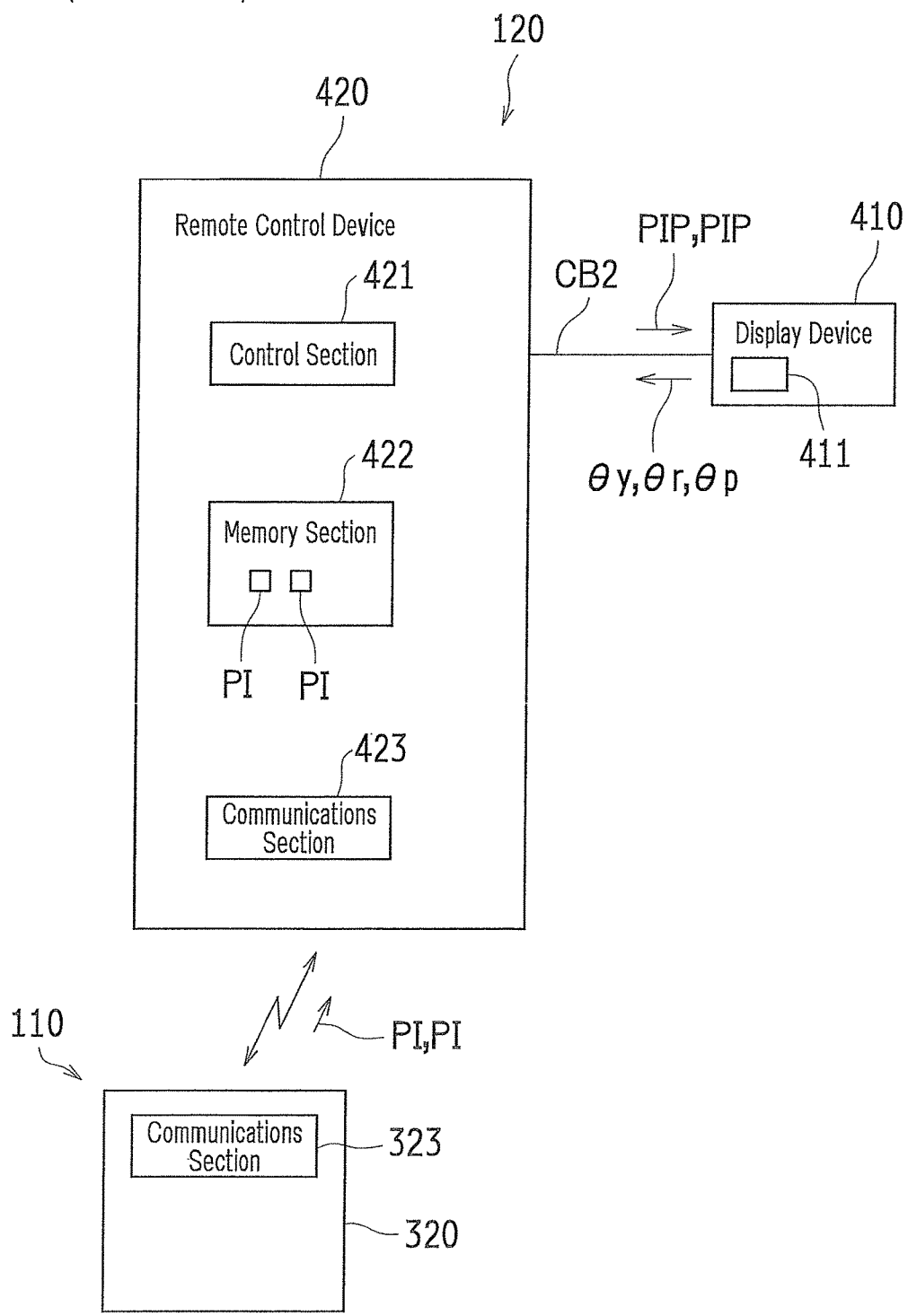
FIG. 10 is a block diagram showing a system configuration for a remote control device provided in the remote control side of the display system in accordance with the third embodiment.

FIG. 9 is a block diagram showing a system configuration for the image processing device 320 provided in the working machine side 110 of the display system 100 for remote control of the working machine 200 in accordance with the third embodiment. FIG. 10 is a block diagram showing a system configuration for the remote control device 420 provided in the remote control side 120 of the display system 100 in accordance with the third embodiment.

As illustrated in FIG. 9, the image processing device 320 in the working machine side 110 generates and transmits a left-eye panoramic image PI (data on a complete left-eye panoramic image PI) and a right-eye panoramic image PI (data on a complete right-eye panoramic image PI) to the remote control device 420 in the remote control side 120 over wireless communications.

As illustrated in FIG. 10, the remote control device 420 in the remote control side 120 receives the left-eye panoramic image PI (data on a complete left-eye panoramic image PI) and the right-eye panoramic image PI (data on a complete right-eye panoramic image PI) from the image processing device 320, cuts out a part PIP of the received left-eye panoramic image PI and a part PIP of the received right-eye panoramic image PI, and transmits the cut-out parts PIP and PIP of the left-eye and right-eye panoramic images PI and PI to the display device 410.

More specifically, the remote control device 420 stores the received left-eye and right-eye panoramic images PI and PI temporarily in the memory section 422.

The remote control device 420 implements a cut-out process to cut out a part PIP of the left-eye panoramic image PI stored in the memory section 422 and a part PIP of the right-eye panoramic image PI stored in the memory section 422.

The cut-out process in which the remote control device 420 cuts out PIP and PIP of panoramic images PI and PI is similar to the cut-out process shown in FIG. 4 in which the image processing device 320 cuts out parts PIP and PIP of panoramic images PI and PI; for this reason, no further details are given here.

The remote control device 420 adjusts the parts PIP and PIP of the left-eye and right-eye panoramic images PI and PI that are to be transmitted to the display device 410 according to the movement of the head 510 of the operator 500 transmitted from the display device 410.

The adjusting process in which the remote control device 420 adjusts parts PIP and PIP of panoramic images PI and PI according to the movement of the head 510 of the operator 500 is similar to the adjusting process shown in FIG. 6 in which the image processing device 320 adjusts PIP and PIP of panoramic images PI and PI according to the movement of the head 510 of the operator 500; for this reason, no further details are given here.

The remote control device 420 cuts out the adjusted parts PIP and PIP of the panoramic images PI and PI from the panoramic images PI and PI.

Figure 11:
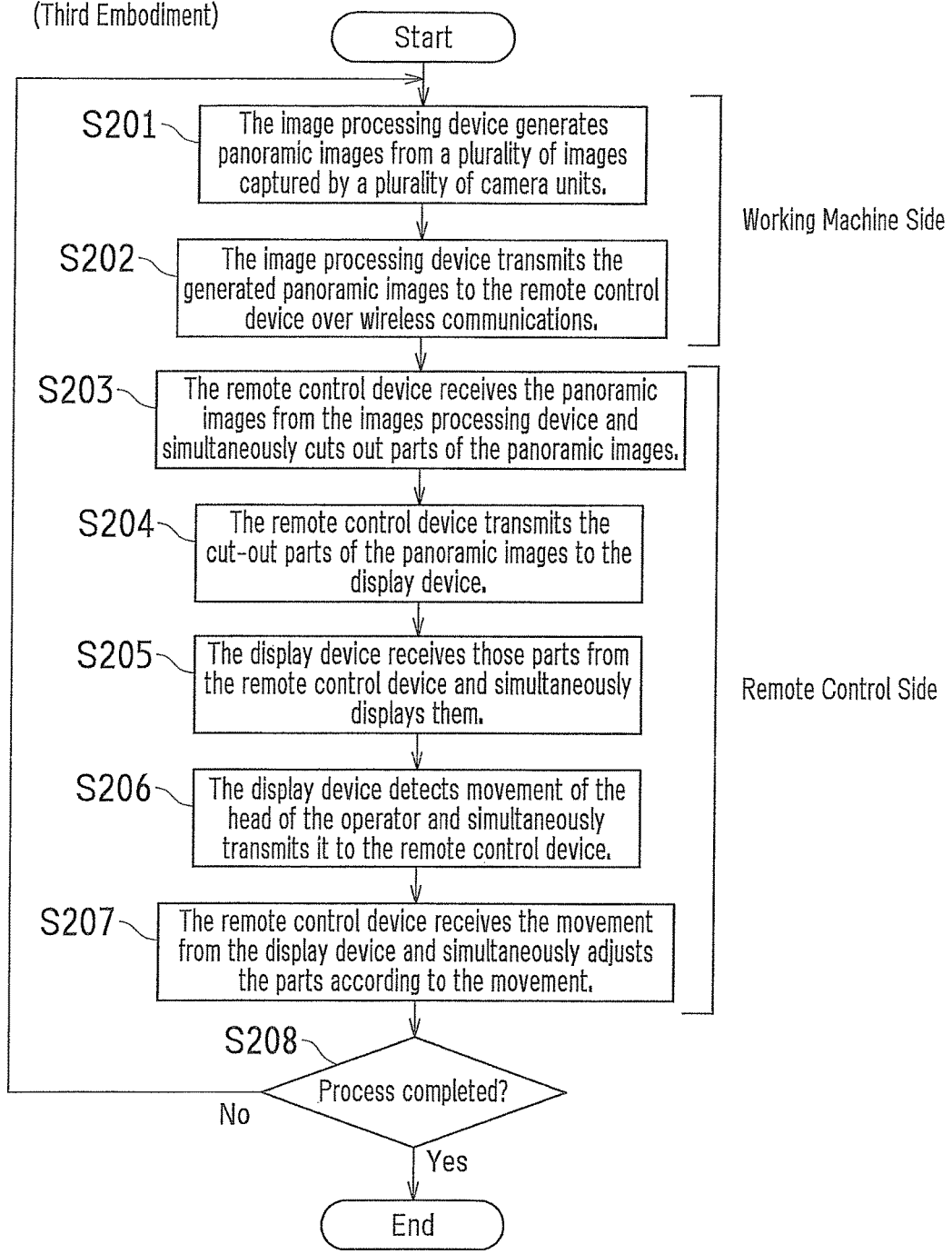
FIG. 11 is a flow chart depicting an exemplary control operation implemented by the display system in accordance with the third embodiment.

FIG. 11 is a flow chart depicting an exemplary control operation implemented by the display system 100 in accordance with the third embodiment.

In the control operation implemented by the display system 100 in accordance with the third embodiment, the image processing device 320 in the working machine side 110 first generates panoramic images PI and PI from a plurality of images IM-IM and IM-IM captured by the camera units 310-310 as illustrated in FIG. 11 (step S201).

Next, the image processing device 320 transmits the generated panoramic images PI and PI to the remote control device 420 in the remote control side 120 over wireless communications (step S202).

Next, the remote control device 420 in the remote control side 120 receives the panoramic images PI and PI from the image processing device 320 in the working machine side 110 and simultaneously implements the cut-out process to cut out parts PIP and PIP of the panoramic images PI and PI (step S203).

Next, the remote control device 420 transmits the cut-out parts PIP and PIP of the panoramic images PI and PI to the display device 410 (step S204).

Next, the display device 410 simultaneously receives and displays the parts PIP and PIP of the panoramic images PI and PI transmitted from the remote control device 420 (step S205).

Next, the display device 410 detects the movement of the head 510 of the operator 500 and simultaneously transmits that movement to the remote control device 420 (step S206).

Next, the remote control device 420 receives the movement of the head 510 of the operator 500 from the display device 410 and simultaneously adjusts the parts PIP and PIP of the panoramic images PI and PI according to the movement of the head 510 (step S207).

The display system 100 in accordance with the third embodiment then repeats steps S201 to S207 above until the process is completed (step S208).

In the display system 100 in accordance with the third embodiment, the remote control device 420 adjusts the parts PIP and PIP of the left-eye and right-eye panoramic images PI and PI that are to be transmitted to the display device 410 according to the movement of the head 510 of the operator 500 transmitted from the display device 410. The display system 100 can hence adjust the three-dimensional view being displayed on the display device 410 according to the movement of the head 510 of the operator 500 and can therefore change the image being displayed on the display device 410 by tracking movement of the line of sight of the operator 500. This configuration can improve remote control operability. Furthermore, the remote control device 420 in the remote control side 120 implements the adjusting process to adjust parts PIP and PIP of panoramic images PI and PI according to the movement of the head 510 of the operator 500. The display system 100 can hence eliminate the time taken to transmit the movement of the head 510 from the remote control device 420 in the remote control side 120 to the image processing device 320 in the working machine side 110 when compared with cases where the image processing device 320 in the working machine side 110 implements the adjusting process.

A display system in which a single camera itself is moved to display an image on the display device needs time to move the camera when the image being displayed on the display device is to be changed.

In contrast, the display system 100 in accordance with the third embodiment can eliminate the time delay that inevitably occurs in moving the cameras when compared with cases where the display system is configured to move a camera to display an image on the display device because the remote control device 420 stores panoramic images PI and PI (omnidirectional images or substantially omnidirectional images).

Fourth Embodiment

Figure 12:
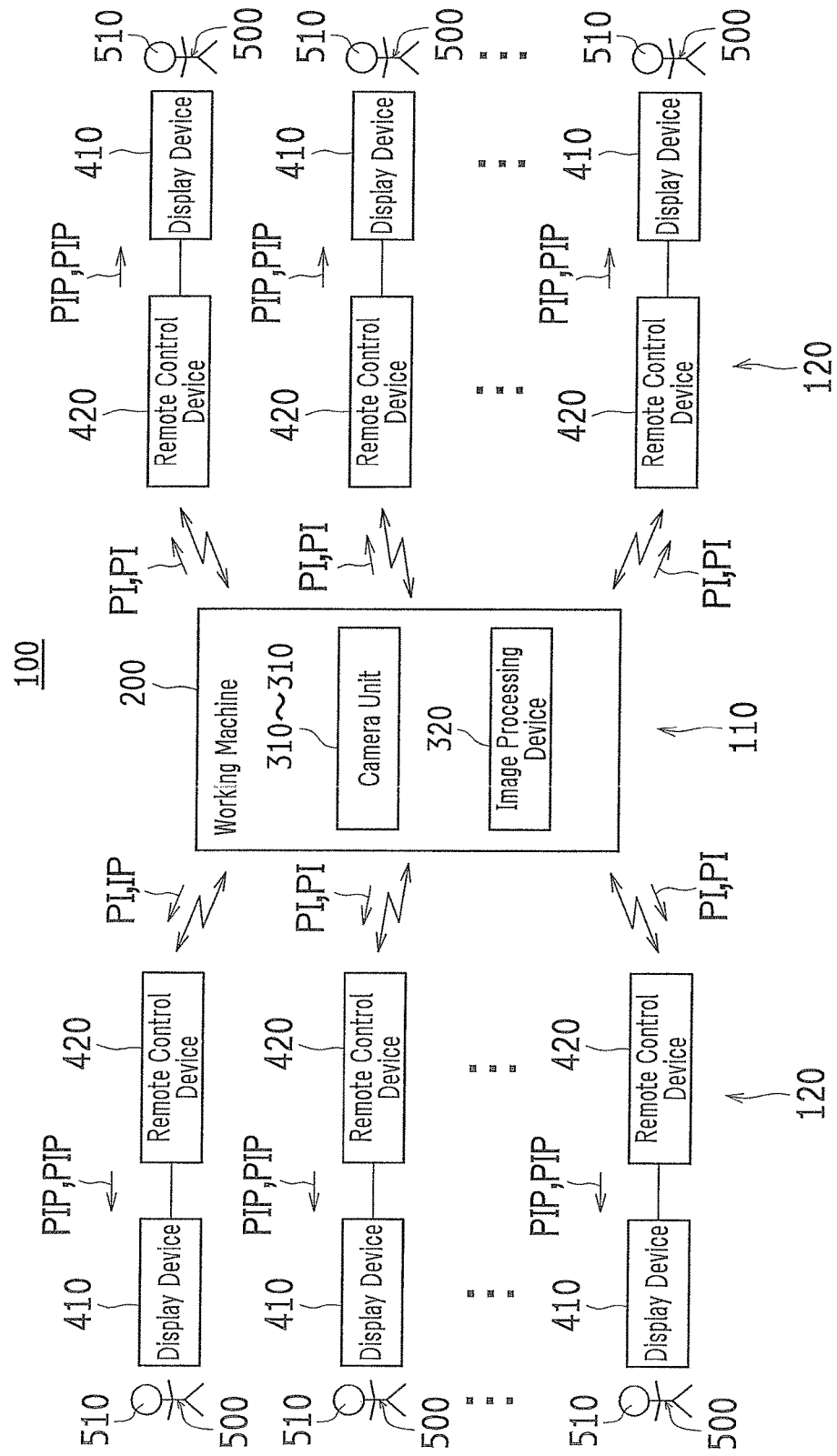
FIG. 12 is a schematic illustration of a display system for remote control of the working machine in accordance with a fourth embodiment.

FIG. 12 is a schematic illustration of a display system 100 for remote control of the working machine 200 in accordance with a fourth embodiment.

As illustrated in FIG. 12, the display system 100 in accordance with the fourth embodiment differs from the display system 100 in accordance with the third embodiment in that the remote control device 420 in the remote control side 120 is replaced with a plurality of remote control devices 420-420 and that the display device 410 is replaced with a plurality of display devices 410-410 that correspond respectively to the remote control devices 420-420.

Those members in the display system 100 in accordance with the fourth embodiment that are practically the same as those in the display system 100 in accordance with the third embodiment are indicated by the same reference numerals. Description will focus on differences from the display system 100 in accordance with the third embodiment.

The image processing device 320 in the working machine side 110 transmits panoramic images PI and PI (data on complete panoramic images PI and PI) to the remote control devices 420-420 in the remote control side 120 over wireless communications. The communications between the image processing device 320 in the working machine side 110 and the remote control devices 420-420 in the remote control side 120 are similar the second embodiment; for this reason, no further details are given here.

The remote control devices 420-420 in the remote control side 120 receive panoramic images PI and PI from the image processing device 320, cut out parts PIP-PIP and PIP-PIP of the received panoramic images PI and PI, and transmit the cut-out parts PIP-PIP and PIP-PIP of the panoramic images PI and PI to the associated display devices 410-410.

The display devices 410-410 in the remote control side 120 receive parts PIP-PIP and PIP-PIP of panoramic images PI and PI from the associated remote control devices 420-420 and display the received parts PIP-PIP and PIP-PIP of the panoramic images PI and PI. A plurality of line-of-sight detecting sections 411-411 (in this example, a plurality of display devices 410-410) detect movement of the heads 510-510 of the associated operators 500-500 and transmit the detected movement of the heads 510-510 of the operators 500-500 to the associated remote control devices 420-420.

The remote control devices 420-420 in the remote control side 120 adjust parts PIP-PIP and PIP-PIP of panoramic images PI and PI according to the movement of the heads 510-510 of the associated operators 500-500 transmitted from the associated line-of-sight detecting sections 411-411 (in this example, the display devices 410-410).

Then, the remote control devices 420-420 cut out the adjusted parts PIP-PIP and PIP-PIP of the panoramic images PI and PI from the panoramic images PI and PI.

The flow of processes implemented by the display system 100 in accordance with the fourth embodiment is practically the same as the flow of processes implemented by the display system 100 in accordance with the third embodiment shown in FIG. 11, except that the remote control device 420 is replaced with the remote control devices 420-420 and that the display device 410 is replaced with the display devices 410-410; for this reason, no further details are given here.

In the display system 100 in accordance with the fourth embodiment, the operators 500-500 can simultaneously view images being displayed on their individual display devices 410-410 in the fields of view that they want. This configuration can improve work safety when compared with cases where a single operator 500 is viewing an image being displayed on his/her display device 410 as in the third embodiment.

Fifth Embodiment

Figure 13:
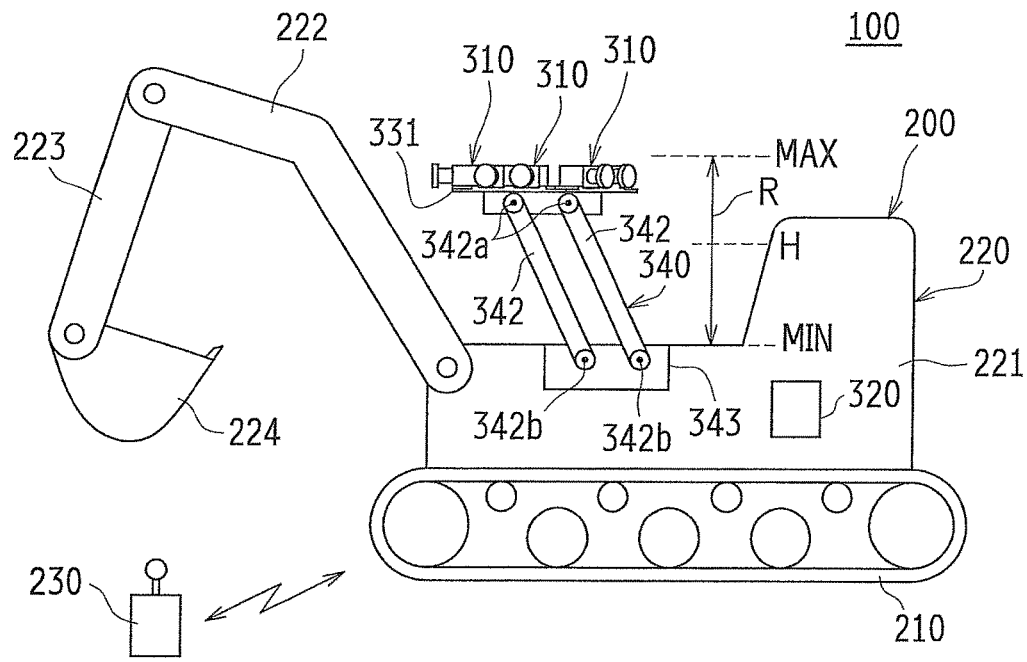
FIG. 13 is a schematic illustration of a display system for remote control of the working machine in accordance with a fifth embodiment.

FIG. 13 is a schematic side view of a display system 100 for remote control of the working machine 200 in accordance with a fifth embodiment.

As illustrated in FIG. 13, the display system 100 in accordance with the fifth embodiment differs from the display systems 100-100 in accordance with the first to fourth embodiments in that the support member 330 provided on the working machine 200 is replaced with a support member 340 capable of upward/downward movement and vertical rotation.

Those members in the display system 100 in accordance with the fifth embodiment that are practically the same as those in the display systems 100-100 in accordance with the first to fourth embodiments are indicated by the same reference numerals, and no further details are given for those members here.

The support member 340 includes a support 331 and a support base (in this example, a support arm 342). The support 331 supports the camera units 310-310. The support base supports the support 331 on its upper end and is in turn supported by the upper body 221 on its lower end, to maintain the camera units 310-310 in a horizontal attitude.

The support arm 342, in this example, may support the support 331 on the upper end so that the support 331 can freely rotate around axis (first fulcrum 342*a*) that extend in the left/right direction and is supported by the upper body 221 on the lower end so that the support arm 342 can freely rotate around axis (second fulcrum 342*b*) that extend in the left/right direction. More specifically, the support arm 342 may be configured so that no matter how the support arm 342 rotate around the axis (second fulcrum 342*b*) that extend in the left/right direction, the second fulcrum 342*b* is always located behind the first fulcrum 342*a*. There are provided a plurality of support arms 342-342 (in this example, two support arms 342 and 342). The support arms 342-342 are structured as parallel links that are disposed parallel to each other in the front/back direction to support the support 331 in such a manner that the support 331 can move up/down. The first fulcrums 342*a*-342*a* and the second fulcrums 342*b*-342*b* of the support arms 342-342 are separated by such distances as to hold the camera units 310-310 in a horizontal attitude. In this example, the first fulcrums 342*a*-

342a and the second fulcrums 342b-342b of the support arms 342-342 are positioned on the same horizontal line. The first fulcrums 342a-342a and the second fulcrums 342b-342b of the support arms 342-342 are separated by equal distances. This configuration enables the support member 340 to hold the camera units 310-310 in a horizontal attitude no matter how the support arms 342-342 rotate around axes (second fulcrums 342b-342b) that extend in the left/right direction. The "horizontal attitude" in this context, as described earlier, is defined as the attitude of the working machine 200 when the working machine 200 is placed on a horizontal plane.

The support member 340 includes a driver section 343 that drives the support arms 342-342. The driver section 343 is actuated in response to an operational instruction transmitted from the remote operation device 230 in the remote control side 120 to rotate the support arms 342-342 and move the camera units 310-310 up/down. This configuration enables the operator 500 to move the camera units 310-310 up/down by remotely controlling the rotation of the support arms 342-342.

In this example, the support member 340 is structured so that the vertical range of motion R of the centers of lenses of the camera units 310-310 can cover a seated height H that corresponds to the height of the eyes of a working person who, having an average physique for a target market of the working machine 200 (e.g., height and sitting height), is presumably seated on a seat. The image processing device 320 may transmit the current (vertical) height of the centers of lenses of the camera units 310-310 to the remote control device 420 which may in turn transmit the current height to the display device 410 so that the display device 410 can display the current height while displaying various indicator positions, for example, the maximum and minimum heights MAX and MIN of the centers of lenses of the camera units 310-310 as well as the seated height H. This configuration enables the operator 500 to recognize the current height of the centers of lenses of the camera units 310-310.

The support member 340 is structured so that when the centers of lenses of the camera units 310-310 are at the seated height H, the camera units 310-310 are located at disposition positions that correspond horizontally (specifically, in the front/back direction) to a position of a seat that could be installed on the working machine 200.

The support arm 342 may be structured to fixedly support the support 331 on the upper end of the support arm 342 in such a manner that the support 331 can be moved up/down.

In the display system 100 in accordance with the fifth embodiment, the camera units 310-310 are disposed on the support member 340 capable of moving up/down and rotating in the vertical direction. This configuration enables the operator 500 to adjust the height of the centers of lenses of the camera units 310-310, and hence the height of the field of view of the operator 500, when necessary. As a result, for example, the operator 500 can grasp a wider field of view on the surroundings of the working machine 200 due to a field of view that resembles a bird's eye view. In addition, if the support member 340 is actuated to decrease the height of the camera units 310-310, the working machine 200 can readily enter a working site located in a hole or with a low ceiling. Furthermore, when the operator 500 is controlling the working machine 200 with a direct view of the surroundings (by directly checking the surroundings), the camera units 310-310 can be retracted into the working machine 200 by actuating the support member 340 in such a manner that the camera units 310-310 can be retracted into the working machine 200. In addition, the support arms 342-342 are structured so that the second fulcrums 342b-342b are always located behind the first fulcrums 342a-342a. This configuration enables the camera units 310-310 to unfailingly capture images of a part of the working component 220 that is located ahead of the first fulcrums 342a-342a.

Sixth Embodiment

The display system 100 in accordance with a sixth embodiment differs from the display systems 100-100 in accordance with the first to fifth embodiments in that illumination devices 350-350 and 350-350 are additionally provided on the periphery (neighborhood or close proximity) of the camera units 310-310.

Figure 14:
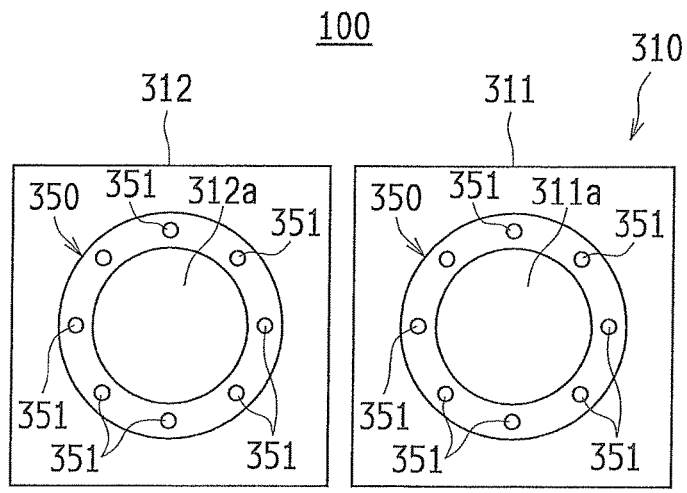
FIG. 14 is a schematic illustration of a pair of cameras constituting a camera unit and exemplary illumination devices disposed on the pair of cameras for a display system for remote control of the working machine in accordance with a sixth embodiment, as they are viewed from the front.

FIG. 14 is a schematic illustration of a pair of cameras 311 and 312 constituting a camera unit 310 and exemplary illumination devices 350 and 350 disposed on the pair of cameras 311 and 312 for a display system 100 for remote control of the working machine 200 in accordance with the sixth embodiment, as they are viewed from the front. All the illumination devices 350-350 and 350-350 disposed on the camera units 310-310 have the same structure; FIG. 14 shows illumination devices 350 and 350 disposed on one of the camera units 310-310 as an example.

As illustrated in FIG. 14, the illumination devices 350 and 350 are disposed on at least a part of the periphery (in this example, on the entire periphery) of the lenses 311a and 312a of the pair of cameras 311 and 312 in such a manner that the light-emitting side faces the subject side. In this example, the illumination devices 350 and 350 include a plurality (eight, in this example) of light-emitting elements 351-351 and 351-351 (specifically, light-emitting diodes) disposed on the entire periphery of the lenses 311a and 312a of the pair of cameras 311 and 312. The light-emitting elements 351-351 and 351-351 are disposed equally or substantially equally separated from each other around the lenses 311a and 312a.

In the display system 100 in accordance with the sixth embodiment, the illumination devices 350-350 and 350-350 are disposed on the periphery of the camera units 310-310. Therefore, the light emitted by the illumination devices 350-350 and 350-350 can efficiently prevent the camera units 310-310 from capturing a shadow in captured images.

Seventh Embodiment

That the operator 500 understands work plans (e.g., on the approximate length, width, and depth of excavation), the rotational range of the working component 220 (specifically, the rotational range of the upper body 221 and the swing range of the boom 222, arm 223, and bucket 224), or the locations of gas pipes, water pipes, and other underground piping prior to starting a project is extremely important at working sites for the improvement of work-related issues, such as work efficiency and safety.

From such a viewpoint, the display system 100 in accordance with a seventh embodiment differs from the display systems 100-100 in accordance with the first to sixth embodiments in that the former offers AR (augmented reality) by displaying, along with parts PIP and PIP of panoramic images PI and PI, parts Q1 and Q1 of work-assisting information Q and Q (miscellaneous supplementary information, including work plans, the rotational range of the working component 220, and the locations of gas pipes, water pipes, and other underground piping) that correspond to the parts PIP and PIP of the panoramic images PI and PI on the display device 410 in such a manner that the parts Q1 and Q1 are associated with the parts PIP and PIP of the panoramic images PI and PI. Augmented reality is technology that enhances information on a real environment with visual information related to the real environment, or more specifically, technology that combines a video of a real environment captured by the camera units 310-310 with a video produced by a computer in association with the real environment in real time in such a manner that the video produced by a computer changes with a change in the video captured by the camera units 310-310 in order to produce a synthesized video.

Figure 15:
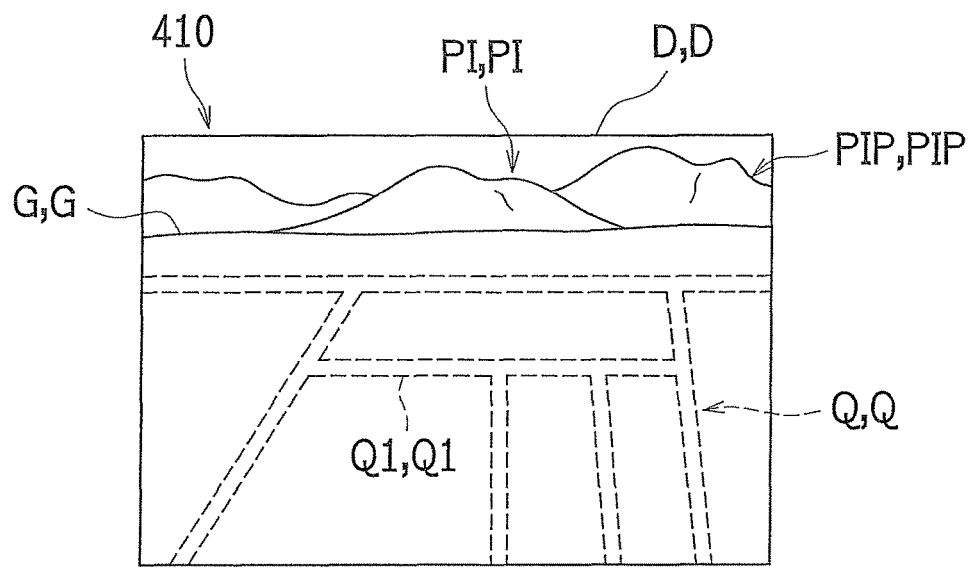
FIG. 15 is a representation of exemplary display screens on a display device for a display system for remote control of the working machine in accordance with a seventh embodiment, the display screens showing, along with parts of panoramic images, parts of work-assisting information associated with those parts of the panoramic images in such a manner that the parts of work-assisting information coincide with the parts of the panoramic images.

FIG. 15 is a representation of exemplary display screens D and D on the display device 410 for a display system 100 for remote control of the working machine 200 in accordance with the seventh embodiment, the display screens D and D showing, along with parts PIP and PIP of panoramic images PI and PI, parts Q1 and Q1 of work-assisting information Q and Q associated with the parts PIP and PIP of the panoramic images PI and PI in such a manner that the parts Q1 and Q1 of work-assisting information Q and Q coincide with the parts PIP and PIP of the panoramic images PI and PI. FIG. 15 shows, as the work-assisting information Q and Q, exemplary underground piping, such as gas pipes and water pipes (the parts Q1 and Q1 of the work-assisting information Q and Q) based on a map of a piping network under the ground G and G. The part PIP of the left-eye panoramic image PI and the part PIP of the right-eye panoramic image PI have practically the same configuration. FIG. 15, not distinguish between the parts PIP and PIP of the left-eye and right-eye panoramic images PI and PI, illustrates processes for augmented reality collectively for both parts.

The remote control devices 420 and 420 in accordance with the first and third embodiments and the image processing device 320 in accordance with the first embodiment add, to cut-out parts PIP and PIP of panoramic images PI and PI, parts Q1 and Q1 of work-assisting information Q and Q that correspond to the cut-out parts PIP and PIP of the panoramic images PI and PI based on a database prepared in advance in the display system 100 (e.g., a database stored in advance in the memory section 422 in the remote control device 420 or in the memory section 322 in the image processing device 320) or a database located at a different location than the display system 100 (e.g., a database downloaded from an Internet server), in such a manner that the parts Q1 and Q1 of work-assisting information Q and Q coincide with the parts PIP and PIP of the panoramic images PI and PI.

Alternatively, the image processing devices 320 and 320 in accordance with the first and third embodiments and the remote control device 420 in accordance with the third embodiment add, to non-cut panoramic images PI and PI, work-assisting information Q and Q that corresponds to the non-cut panoramic images PI and PI based on a database prepared in advance in the display system 100 (e.g., a database stored in advance in the memory section 422 in the remote control device 420 or in the memory section 322 in the image processing device 320) or a database located at a different location than the display system 100 (e.g., a database downloaded from an Internet server), in such a manner that the work-assisting information Q and Q coincides with the panoramic images PI and PI. In the cut-out process in which parts PIP and PIP of the panoramic images PI and PI are cut out, the corresponding parts Q1 and Q1 of the work-assisting information Q and Q are also cut out.

The database may be, for example, a database that is found in CAD (computer aided design) models. Panoramic images PI and PI contain, for example, location information (latitude and longitude) for the working machine 200 that is available with the GNNS (global navigation satellite system). The work-assisting information Q and Q is, for example, information constituting a panoramic image that contains location information (latitude and longitude) that corresponds to the location information (latitude and longitude) of the panoramic images PI and PI.

The display device 410 displays, along with parts PIP and PIP of panoramic images PI and PI, parts Q1 and Q1 of work-assisting information Q and Q that correspond to the parts PIP and PIP of the panoramic images PI and PI in such a manner that the parts Q1 and Q1 of the work-assisting information Q and Q coincide with the parts PIP and PIP of the panoramic images PI and PI.

This configuration enables the operator 500 to appreciate the work-assisting information Q and Q in advance. For example, the operator 500 can recognize whether or not the rotational position of the working component 220 (specifically, the rotational position of the upper body 221 and the swing positions of the boom 222, arm 223, and bucket 224) has reached a predetermined reference level stipulated in the work plan (e.g., has exceeded a reference job depth or a predetermined reference working range), has reached the working range in the working site (e.g., would come into contact with the ceiling of the working site), or has reached underground objects in the working site (e.g., would come into contact with gas pipes, water pipes, and other underground piping Q1).

This augmented reality may be achieved using a publicly known, conventional technique; for this reason, no further details are given here.

In the display system 100 in accordance with the seventh embodiment, the display device 410 displays, along with parts PIP and PIP of panoramic images PI and PI, parts Q1 and Q1 of work-assisting information Q and Q that correspond to the parts PIP and PIP of the panoramic images PI and PI based on a database prepared in advance in the display system 100 or a database located at a different location than the display system 100 in such a manner that the parts Q1 and Q1 of work-assisting information coincide with the parts PIP and PIP of the panoramic images PI and PI. This configuration enables the operator 500 to recognize the work-assisting information Q and Q (miscellaneous supplementary information, including work plans, the rotational range of the working component, or the locations of gas pipes, water pipes, and other underground piping). That in turn can improve work-related issues, such as work efficiency and safety.

The present invention is by no means limited to the embodiments and examples described above and may be carried out in other various forms. Therefore, the embodiments are for illustrative purposes only in every respect and should not be subjected to any restrictive interpretations. The scope of the present invention is defined only by the claims and never bound by the specification. Those modifications and variations that may lead to equivalents of claimed elements are all included within the scope of the invention.

INDUSTRIAL APPLICABILITY

The present invention relates to a display system for remote control of a working machine and is applicable, especially, for the purpose of tracking movement of the line of sight of an operator to accordingly change the image being displayed on a display device.

REFERENCE SIGNS LIST

100 Display System
110 Working Machine Side
120 Remote control side
200 Working Machine
210 Traveling Body
220 Working Component
221 Upper Body
222 Boom
223 Arm
224 Bucket
230 Remote Operation Device
231 Operation Section
300 Components in Working Machine Side
310 Camera Unit
311 Left-eye Camera
311a Lens
312 Right-eye Camera
312a Lens
320 Image Processing Device
321 Control Section
322 Memory Section
323 Communications Section
330 Support Member
331 Support
331a Fixing Member
332 Post
340 Support Member
342 Support Arm
342a First Fulcrum
342b Second Fulcrum
343 Driver Section
350 Illumination Device
351 Light-emitting Element
400 Components in Remote control side
410 Display Device
411 Line-of-sight Detecting Section
420 Remote Control Device
421 Control Section
422 Memory Section
423 Communications Section
500 Operator
510 Head
CB1 Connecting Cable
CB2 Connecting Cable
D Display Screen
G Ground
H Seated Height
IM Image
MAX Maximum Height
MIN Minimum Height
PI Panoramic Image
PIP Part of Panoramic Image
Q Work-assisting Information
Q1 Part of Work-assisting Information
R Range of Motion
d Distance
Δα Relative Reference Point
α Reference Point
ß Horizontal Cut-out Angle
γ Vertical Cut-out Angle
θp Pitching Angle
θr Rolling Angle
θy Yawing Angle
φp Pitching Reference Angle
φr Rolling Reference Angle
φy Yawing Reference Angle

The invention claimed is:

1. A display system for remote control of a working machine, comprising:
a plurality of camera units attached to a working machine having a working component capable of horizontal rotation and vertical swinging;
an image processing device, provided in the working machine, configured to generate a panoramic image based on a plurality of images captured by the plurality of camera units and transmit a part of the generated panoramic image via wireless communication;
a display device in a remote control side of the display system; and
a remote control device configured to receive the part of the panoramic image from the image processing device and transmit the received part of the panoramic image to the display device, wherein:
each camera unit includes a pair of a left-eye camera and a right-eye camera,
the image processing device is configured to generate a left-eye panoramic image and a right-eye panoramic image based respectively on left-eye and right-eye images captured by the pairs of cameras and transmit altered left-eye and right-eye panoramic images to the remote control device over wireless communications,
the remote control device is configured to receive the altered left-eye and right-eye panoramic images from the image processing device and transmit the altered left-eye and right-eye panoramic images to the display device,
the display device, designed to be mounted on the head of an operator, is configured to receive the p altered left-eye and right-eye panoramic images from the remote control device and display the altered left-eye and right-eye panoramic images, the display device includes a line-of-sight detecting section configured to detect movement of eyeballs of the operator and transmit the detected movement of the eyeballs of the operator to the remote control device,
the remote control device is configured to transmit, to the image processing device via wireless communication, the movement of the eyeballs of the operator transmitted from the display device,
the image processing device is configured to adjust the altered left-eye and right-eye panoramic images that are to be transmitted to the display device according to the movement of the eyeballs of the operator transmitted from the remote control device, and
if a response speed of the movement of the eyeballs of the operator is faster than a predetermined response speed, the image processing device is configured to implement an adjusting process or a cut-out process by delaying the response of the line-of-sight detecting section.

2. The display system set forth in claim 1, wherein
the display device is configured to display augmented work-assisting information that based on a database includes the locations of gas pipes, water pipes, and other underground piping embedded in the left-eye and right-eye panoramic images, in such a manner that the image processing device adjusts the augmented work-assisting information to coincide with the parts of the left-eye and right-eye panoramic images.

3. The display system as set forth in claim 1, wherein the plurality of camera units are located at disposition positions that correspond horizontally to a position of a seat that could be installed on the working machine, so that the plurality of camera units have centers of lenses thereof at a seated height that corresponds to a height of the eyes of a working person who, having an average physique for a target market of the working machine, is presumably seated on the seat.

4. The display system as set forth in any one of claim 1, wherein the plurality of camera units are provided on a support member capable of upward/downward movement and vertical rotation.

5. The display system as set forth in claim 1, the display system further comprising an illumination device on a periphery of the plurality of camera units.

6. A display system for remote control of a working machine, comprising:
a plurality of camera units attached to a working machine having a working component capable of horizontal rotation and vertical swinging;
an image processing device, provided in the working machine, configured to generate a panoramic image based on a plurality of images captured by the plurality of camera units and transmit the generated panoramic image over wireless communications;
a display device in a remote control side of the display system; and
a remote control device configured to receive the panoramic image from the image processing device and transmit a part of the received panoramic image to the display device, wherein:
each camera unit includes a pair of a left-eye camera and a right-eye camera,
the image processing device is configured to generate a left-eye panoramic image and a right-eye panoramic image based respectively on left-eye and right-eye images captured by the pairs of cameras and transmit the generated left-eye and right-eye panoramic images to the remote control device via wireless communication,
the remote control device is configured to receive the left-eye and right-eye panoramic images from the image processing device and transmit parts of the received left-eye and right-eye panoramic images to the display device,
the display device, designed to be mounted on the head of an operator, configured to receive the parts of the left-eye and right-eye panoramic images from the remote control device and display the received parts of the left-eye and right-eye panoramic images, the display device includes a line-of-sight detecting section configured to detect movement of eyeballs of the operator and transmit the detected movement of the eyeballs of the operator to the remote control device,
the remote control device configured to adjust the parts of the left-eye and right-eye panoramic images that are to be transmitted to the display device according to the movement of the eyeballs of the operator transmitted from the display device, and
if a response speed of the movement of the eyeballs of the operator is faster than a predetermined response speed, the remote control device is configured to implement an adjusting process or a cut-out process by delaying the response of the line-of-sight detecting section.

7. The display system as set forth in claim 6, wherein the display device is configured to display, augmented work-assisting information that includes the locations of gas pipes, water pipes, and other underground piping embedded in the left-eye and right-eye panoramic images based on a database, in such a manner that the image processing device adjusts the augmented work-assisting information to coincide with the parts of the left-eye and right-eye panoramic images.

8. The display system as set forth in claim 2, wherein the plurality of camera units are located at disposition positions that correspond horizontally to a position of a seat that could be installed on the working machine, so that the plurality of camera units have centers of lenses thereof at a seated height that corresponds to a height of the eyes of a working person who, having an average physique for a target market of the working machine, is presumably seated on the seat.

9. The display system as set forth in any one of claim 2, wherein the plurality of camera units are provided on a support member capable of upward/downward movement and vertical rotation.

10. The display system as set forth in any one of claim 3, wherein the plurality of camera units are provided on a support member capable of upward/downward movement and vertical rotation.

11. The display system as set forth in any one of claim 8, wherein the plurality of camera units are provided on a support member capable of upward/downward movement and vertical rotation.

12. The display system as set forth in claim 2, the display system further comprising an illumination device on a periphery of the plurality of camera units.

13. The display system as set forth in claim 3, the display system further comprising an illumination device on a periphery of the plurality of camera units.

14. The display system as set forth in claim 4, the display system further comprising an illumination device on a periphery of the plurality of camera units.

15. The display system as set forth in claim 8, the display system further comprising an illumination device on a periphery of the plurality of camera units.

16. The display system as set forth in claim 9, the display system further comprising an illumination device on a periphery of the plurality of camera units.

17. The display system as set forth in claim 1, wherein the line-of-sight detecting section configured to detect a yawing angle around an axis which extends in the vertical direction with respect to the head of the operator, a rolling angle around an axis which extends in the front/back direction with respect to the head of the operator, and a pitching angle around an axis which extends in the left/right direction with respect to the head of the operator.

18. The display system as set forth in claim 17, wherein the altered left-eye and right-eye panoramic images are fragments that have been cut out of the left-eye and right-eye panoramic images.

19. The display system as set forth in claim 17, wherein the altered left-eye and right-eye panoramic images are cut out of the left-eye and right-eye panoramic images to correspond to a view angle of the operator by using a predetermined reference point.

20. The display system as set forth in claim 17, wherein the image processing device is configured to calculate a relative reference point for each left-eye and right-eye panoramic image that is displaced from a predetermined reference point by the movement detected by the line-of-sight detecting section.

* * * * *